US008549087B2

(12) United States Patent
Leonard

(10) Patent No.: US 8,549,087 B2
(45) Date of Patent: Oct. 1, 2013

(54) METHODS AND SYSTEMS FOR ALLOCATING AND INDICATING TRUSTWORTHINESS OF SECURE COMMUNICATIONS

(75) Inventor: Sean Joseph Leonard, Sacramento, CA (US)

(73) Assignee: Penango, Inc., Los Angeles, CA (US)

( * ) Notice: Subject to any disclaimer, the term of this patent is extended or adjusted under 35 U.S.C. 154(b) by 0 days.

(21) Appl. No.: 13/157,230

(22) Filed: Jun. 9, 2011

(65) Prior Publication Data

US 2012/0143967 A1    Jun. 7, 2012

Related U.S. Application Data

(63) Continuation of application No. 12/369,672, filed on Feb. 11, 2009, now abandoned.

(60) Provisional application No. 61/112,719, filed on Nov. 7, 2008.

(51) Int. Cl.
*G06F 15/16* (2006.01)

(52) U.S. Cl.
USPC ............ 709/206; 713/155; 713/170; 713/176

(58) Field of Classification Search
USPC .................................................. 709/206, 207
See application file for complete search history.

(56) References Cited

U.S. PATENT DOCUMENTS

| 5,872,849 | A | 2/1999 | Sudia |
| 6,009,177 | A | 12/1999 | Sudia |

(Continued)

FOREIGN PATENT DOCUMENTS

| EP | 1164745 A2 | 12/2001 |
| EP | 2 201 737 | 6/2010 |

(Continued)

OTHER PUBLICATIONS

PCT International Search Report and Written Opinion, Application No. PCT/US2008/080049, Application Date Oct. 15, 2008, 19 pages.

(Continued)

*Primary Examiner* — Tauqir Hussain
(74) *Attorney, Agent, or Firm* — Knobbe Martens Olson & Bear, LLP

(57) ABSTRACT

Embodiments of the present invention enable allocating and indicating the trustworthiness of a message, especially messages that comprise content that has been digitally signed. In some embodiments, a provider of assurance services and assurance software provides trust attestations related to messages and may manipulate the user interface used to view these messages. The trust attestations may be computed by various methods. The trust attestations may then be presented when the message is displayed to the user using the assurance software. For example, the trust attestations may be displayed as user interface elements in a designated portion of the chrome of a messaging service, such as a webmail service. In one embodiment, the assurance software can run on the webmail service and the trust attestations in the chrome are served up via techniques for delivery of client-server presentation data. In another embodiment, the assurance software is implemented as software that runs on the client and may perform some computations on the client in order to manipulate the messaging service's chrome. In yet another embodiment, the assurance software may run as an extension to an e-mail client that runs on a user's machine. The assurance software is configured to work with the presenter of the message, but independently of the presenter.

19 Claims, 12 Drawing Sheets

(56) References Cited

U.S. PATENT DOCUMENTS

| | | | |
|---|---|---|---|
| 6,202,150 | B1 | 3/2001 | Young et al. |
| 6,389,136 | B1 | 5/2002 | Young et al. |
| 6,463,534 | B1 | 10/2002 | Geiger et al. |
| 7,082,538 | B2* | 7/2006 | Bouchard et al. ............. 713/181 |
| 7,243,238 | B2 | 7/2007 | Watanabe et al. |
| 2001/0050990 | A1 | 12/2001 | Sudia |
| 2001/0055396 | A1 | 12/2001 | Jevans |
| 2002/0049681 | A1 | 4/2002 | Herreweghen |
| 2002/0069361 | A1 | 6/2002 | Watanabe et al. |
| 2002/0162003 | A1 | 10/2002 | Ahmed |
| 2003/0028495 | A1 | 2/2003 | Pallante |
| 2003/0076961 | A1 | 4/2003 | Kim et al. |
| 2003/0172122 | A1* | 9/2003 | Little et al. ..................... 709/207 |
| 2004/0109568 | A1 | 6/2004 | Slick et al. |
| 2005/0054334 | A1* | 3/2005 | Brown et al. ............. 455/414.4 |
| 2005/0246533 | A1* | 11/2005 | Gentry ......................... 713/170 |
| 2006/0015736 | A1* | 1/2006 | Callas et al. .................. 713/176 |
| 2006/0227808 | A1* | 10/2006 | Estable ......................... 370/466 |
| 2006/0293035 | A1 | 12/2006 | Brown et al. |
| 2007/0022162 | A1 | 1/2007 | Thayer et al. |
| 2007/0022295 | A1* | 1/2007 | Little et al. ..................... 713/176 |
| 2007/0143596 | A1 | 6/2007 | Myers et al. |
| 2007/0220614 | A1 | 9/2007 | Ellis et al. |
| 2008/0148397 | A1* | 6/2008 | Litvin et al. ..................... 726/22 |
| 2008/0222425 | A1 | 9/2008 | Buss |
| 2008/0288278 | A1* | 11/2008 | Buss ................................. 705/1 |
| 2009/0100263 | A1 | 4/2009 | Leonard |
| 2009/0106557 | A1 | 4/2009 | Leonard |
| 2009/0113328 | A1 | 4/2009 | Leonard |
| 2010/0121928 | A1 | 5/2010 | Leonard |
| 2010/0121931 | A1* | 5/2010 | Brown et al. ................. 709/206 |
| 2012/0143967 | A1 | 6/2012 | Leonard |

FOREIGN PATENT DOCUMENTS

| | | |
|---|---|---|
| EP | 2 204 033 | 7/2010 |
| JP | 2011-501578 | 1/2011 |
| KR | 3032423 A | 4/2003 |
| WO | WO 2009/052217 | 4/2009 |
| WO | WO 2009/052524 | 4/2009 |
| WO | WO 2010/053999 | 5/2010 |

OTHER PUBLICATIONS

PCT International Preliminary Report on Patentability, Application No. PCT/US2008/080556, Application Date Oct. 20, 2008. 9 pages.
PCT International Search Report and Written Opinion, Application No. PCT/US2008/080556, Application Date Oct. 20, 2008. 15 pages.
PCT International Search Report and Written Opinion, Application No. PCT/US2009/063291, Application Date Nov. 4, 2009. 10 pages.
PCT International Preliminary Report on Patentability dated May 10, 2011, Application No. PCT/US2009/063291, Application Date Nov. 4, 2009. 6 pages.
Ben Adida, et al., Lightweight Email Signatures, Computer Science and Artificial Intelligence Laboratory, Massachusetts Institute of Technology; Cambridge, MA, Feb. 1, 2006, pp. 1-20.
Garfunkel, et al., "How to Make Secure Mail Easier to Use" CHI 2005, Apr. 2-7, 2005, Portland Oregon, USA.
Masone and Smith, "Towards Usefully Secure Email" Department of Computer Science, Dartmouth College, IEEE Technology and Society (Special Issue on Security and Usability), 26 (12): 25-34. Spring 2007.
Peter Gutmann, "Why Isn't the Internet Secure Yet, Dammit?" University of Auckland, presented at the 2004 AusCERT Conference, May 23-27, 2004, pp. 1-41.
Adams, C., et al., Internet X.509 Public Key Infrastructure Time Stamp Protocol (TSP), RFC 3161, Aug. 2001.
Comodo, "Free Secure Email Certificates," <http://www.instantssl.com/ssl-certificate-products/free-email-certificate.html> (retrieved by archive.org on Oct. 11, 2007).
Esposito, Dino, "Browser Helper Objects," <http://msdn2.microsoft.com/en-s/library/bb250436.aspx> (published Jan. 1999).
Extensions—Mozilla Developer Center, <http://developer.mozilla.org/en/docs/Extensions> (May 30, 2007).
Fu, Anthony Y., et al., "The Methodology and an Application to Fight Against Unicode Attacks," Symposium on Usable Privacy and Security (SOUPS), Jul. 12-14, 2006, Pittsburgh, PA.
Garfinkel, Simson, "Design Principles and Patterns for Computer Systems That Are Simultaneously Secure and Usable," <http://hdl.handle.net/1721.1/33204> (May 2005).
Glick, Jennifer, Mozilla/MachV: Mail: Security: Encryption and Signing, Oct. 3, 2001, http://www-archive.mozilla.org/mailnews/specs/security/.
Goodmail Systems, Senders: How It Works, http://www.goodmailsystems.com/senders/how_it_works.php (retrieved by archive.org on May 17, 2007).
Gutmann, Peter, "PKI Technology Survey and Blueprint," <http://www.cs.auckland.ac.nz/~pgut001/pubs/pkitech.pdf> (Mar. 31, 2003).
Housley, R., Cryptographic Message Syntax (CMS), RFC 3852, Jul. 2004.
Housley, R., Internet X.509 Public Key Infrastructure Certificate and Certificate Revocation List (CRL) Profile, RFC 3280, Apr. 2002.
IBM PCI Cryptographic Coprocessor, described in IBM Cryptographic Products: IBM PCI Cryptographic Coprocessor: General Information Manual, May 2002, 6th ed., IBM Corporation.
Jackson, Collin, et al., "An Evaluation of Extended Validation and Picture-in-Picture Phishing Attacks," Proceedings of Usable Security (USEC'07), Feb. 2007.
Jones, Richard and Sean Leonard, software product entitled "Gmail S/MIME 0.2.4" (Jul. 26, 2007), described in <http://richard.jones.name/google-hacks/gmail-smime/gmail-smime.html>.
Klensin, J., Simple Mail Transfer Protocol, RFC 2821, Apr. 2001.
Krammer, Victor, "Phishing Defense Against IDN Address Spoofing Attacks," Proceedings of the 2006 International Conference on Privacy, Security and Trust, May 2006.
Lieberman, Eric and Robert C. Miller, "Facemail: Showing Faces of Recipients to Prevent Misdirected Email" (retrieved by archive.org on Aug. 24, 2007).
PCT International Search Report and Written Opinion, dated Apr. 24, 2009, re PCT Application No. PCT/US2008/080049, application dated Oct. 15, 2008, in 19 pages.
Plaxo Products, <http://www.plaxo.com/products> (retrieved by archive.org on Oct. 11, 2007).
Ramsdell, B., S/MIME Version 3 Message Specification, RFC 2633 (Jun. 1999).
Wu, Min, et al., "Do Security Toolbars Actually Prevent Phishing Attacks?" CHI 2006, Apr. 22-27, 2006, ACM, Montreal, Quebec, Canada.

* cited by examiner

FIG. 2A

Certificate

General | Details | Certification Path

Show: <All>

| Field | Value |
|---|---|
| Issuer | Personal Issuing C... |
| Valid from | Sunday, July 01, 2007 12:40:22 AM |
| Valid to | Monday, June 30, 2008 12:40:22 AM |
| Subject | |
| Public key | RSA (4096 Bits) |
| Subject Alternative Name | RFC822 Name... |
| Basic Constraints | Subject Type=End Entity, Path Len... |
| Thumbprint algorithm | sha1 |

E =
E =
E =
CN = Sean
G = Sean
SN -

[Edit Properties...] [Copy to File...]

Certificate

General | Details | Certification Path

Show: <All>

| Field | Value |
|---|---|
| Valid from | Thursday, May 17, 2007 7:00:00 PM |
| Valid to | Saturday, May 17, 2008 6:59:59 PM |
| Subject | |
| Public key | RSA (1024 Bits) |
| Authority Key Identifier | KeyID=89 82 67 7d c4 9d 26 70 00 4... |
| Subject Key Identifier | 8e 4a df 80 3c dd af 35 43 c2 e5 d6 7... |
| Enhanced Key Usage | Secure Email (1.3.6.1.5.5.7.3.4), Un... |
| Netscape Cert Type | SMIME(20) |

E =
CN = Sean
OU = (c)2003 Limited
OU = Terms and Conditions of use: http://www.anywhere.net/repository
OU = Trust Network - PERSONA NOT VALIDATED

[Edit Properties...] [Copy to File...]

[OK]

METHODS AND SYSTEMS FOR ALLOCATING AND INDICATING TRUSTWORTHINESS OF SECURE COMMUNICATIONS

CROSS-REFERENCE TO RELATED APPLICATIONS

This application is a continuation of U.S. patent application Ser. No. 12/369,672 filed Feb. 11, 2009 and entitled "METHODS AND SYSTEMS FOR ALLOCATING AND INDICATING TRUSTWORTHINESS OF SECURE COMMUNICATIONS," which claims the benefit of U.S. Provisional Patent Application No. 61/112,719 filed on Nov. 7, 2008, entitled "Methods and Systems for Allocating and Indicating Trustworthiness of Secure Communications," by Sean J. Leonard, all of which are incorporated herein by reference in their entireties. This application is also related to U.S. patent application Ser. No. 12/252,335 filed on Oct. 15, 2008 entitled "Methods and Systems for Encouraging Secure Communications," by Sean J. Leonard, U.S. patent application Ser. No. 12/254,797 filed on Oct. 20, 2008, entitled "Method and Systems for Indicating Trustworthiness of Secure Communications," by Sean J. Leonard, and to U.S. patent application Ser. No. 12/262,131 filed on Oct. 30, 2008, entitled "Multidimensional, Multistate User Interface Elements," by Sean J. Leonard, all of which are incorporated herein by reference in their entireties.

BACKGROUND

1. Field

This invention relates to electronic communications and messaging systems. In particular, embodiments of the present invention relate to secure messaging systems, such as encrypted and authenticated messaging systems, and procedures and systems for determining, allocating, and indicating the trustworthiness of secure messages.

2. Description of the Related Art

Today, networks like the Internet and mobile networks allow for wide access to communications and messaging, such as e-mail, text messages, instant messages, and the like. Surprisingly, however, most of this communications and messaging traffic is not secured or protected. For example, the overwhelming majority of e-mail messages are sent unencrypted and unsigned, so that any eavesdropper on a communications session over the Internet can read and alter such e-mail while it is in transit or in storage.

Sending and receiving encrypted and signed (e.g., authenticated) messages is a capability well-known in the art. In a typical system, a user may obtain a certificate for free or for a fee from a certification or certification authority (CA). The CA verifies the user's identity and e-mail address. The user can then navigate to CA's website and completes a series of actions, such as filling out forms, on the website. This typically entails the user entering personal data, including an e-mail address. A public-private key pair is then generated for the user. The user submits a certificate request containing his or her public key along with the rest of the aforementioned information during the course of submitting data to the website. The private key is stored on the user's computer. The CA's website then verifies the user's identity by sending a confirmation, for example, via an e-mail to the user. In the confirmation, a link is included, and when the user manually follows the link, the CA's website causes an issued certificate to be installed into the user's web browser and united with the related private key.

Unfortunately, the use of these security mechanisms is not widespread. For example, despite the existence of well-established CAs and public key infrastructure (PKI), the use of technologies, such as S/MIME and PGP, is not widespread. One reason for the lack acceptance is even with the use of digital signatures and encrypted content for e-mails, it is difficult for users to know with confidence who is contacting them and who they are contacting.

A problem with known messaging systems is that these systems send a message with unverified information, for example, in the "From" line, about who the message is from. But, typical e-mail systems have no independent way to verify that such messages really came from the sender identified in the From line.

In addition, most users do not understand how computers or messaging services work. Instead, users generally rely upon their software and systems to have sensible defaults in the majority of circumstances. Only when such settings materially affect their computing experiences do users endeavor to change them. For example, as noted, PKI is known in the art. However, almost all users rely on PKI, without understanding how PKI works and without explicitly trusting that PKI works well or in any particular way.

BRIEF DESCRIPTION OF THE DRAWINGS

FIGS. 2A-B shows certificates from two different providers, with different formats for similar types of information that may be used in embodiment of the present disclosure.

DETAILED DESCRIPTION OF EMBODIMENTS

Figure 1:
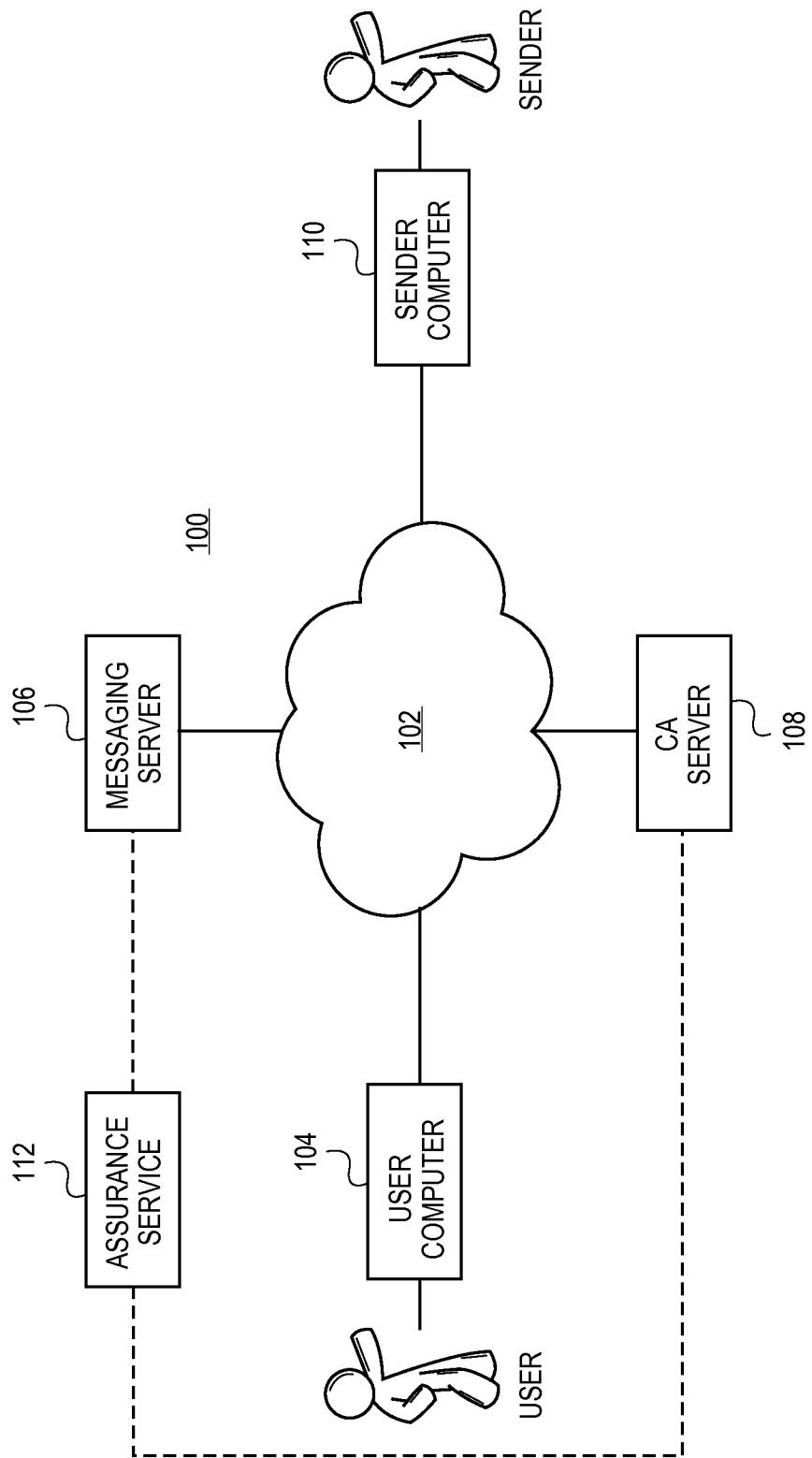
FIG. 1 shows an exemplary system consistent with embodiments of the present disclosure.

In some embodiments, a provider of assurance services and software provides trust attestations related to messages using assurance software and may manipulate the user interface used to view these messages. The trust attestations may be computed by various methods including the use of public key cryptography and the PKI infrastructure, or scanning for content for certain indicia. The trust attestations may then be presented when the message is displayed to the user. For example, the trust attestations may be displayed as one or more user interface elements in a designated portion of the chrome of a webmail service.

In one embodiment, the assurance software runs on the webmail service as chrome and the trust attestations are served in the chrome via techniques for delivery of client-server presentation data, such as HTTP data. In another embodiment, the assurance software is implemented as software that runs on the client and may perform some computations on the client in order to manipulate the messaging service's chrome.

Embodiments of the present disclosure relate to methods and systems for assurance software, such as software for a user interface element that is controlled by an entity separate from the messaging system. Although the assurance software may be controlled by a separate entity, the assurance software may be merged with the software that presents the messages, such as a webpage for webmail or an e-mail client. In the embodiments, the presenter of the message may be prevented or restricted from changing the assurance software, changing the operation of the assurance software, or changing any results provided by the assurance software. The assurance software can indicate that responsibility or liability for attestations made in or about a message has been transferred from the presenter software or from the messaging service which presents user interface elements through the presenter software, under the messaging service's control, to others. For example, the assurance software may indicate sponsorship or control of user interface elements under its control, and thus transfer at least some responsibility or liability to itself (and therefore the assurance service), or may pass responsibility or liability along to other entities as disclosed herein.

In various embodiments, the assurance software may exert various levels of control over its user interface elements. For example, in some embodiments, the assurance software may exert exclusive control over its user interface elements, and thus, the presenter, such as a webmail service or e-mail client, of a message, may be prevented from modifying the assurance software or its user interface elements. In other embodiments, the assurance software may allow or grant certain levels of control to the presenter, such as allowing for different colors, fonts, sizes, etc. Of course, the assurance software may grant certain levels of control to modify other aspects of user interface elements, such as the chrome of the mail client, that are in proximity to a message.

For example, for webmail messages that presented via serving HTML web pages, a browser, such as Mozilla Firefox, may act as the presenter of the message on behalf of the webmail service. The assurance software may be implemented as modified browser or webmail chrome that, for example, shows information bars and other information regarding attestations in or about the message. In some embodiments, these attestations can be presented by the assurance software in such a way that indicates liability for the attestations has been transferred away from the presenter, i.e., the webmail service or e-mail client, and to another party, such as a CA that issued a credential used in the message.

One skilled in the art will also recognize that the embodiments may employ a variety of user interface elements. For example, the assurance software may provide user interface elements that employ audio or tactile elements as part of its operations. In the case of an audio element, a distinct sound indicative of the assurance software's operation may be emitted in proximity to an aural rendering of the attestations. For example, an audio element "in proximity to an attestation" may be provided by being before an attestation, after an attestation, or concurrently with an attestation, such as, as in the form of background music, an audio clip, and the like. In the case of a tactile message, vibration may be used. Or, when the user is interacting with the system using a tactile interface, such as a Braille interface, a distinct combination of bumps may be employed before, after, or concurrently with an attestation, such as, in the form of an underline bump pattern that does not alter the meaning of the Braille but may be perceived by the user as a distinguishing feature of the tactile element.

The transfer of liability may result in various ways, such as an indemnification relationship, through the practices and acts of attesters, such as a CA, upon which parties may rely, or via a contractual relationship formed between the attester and the provider of the assurance software. In general, the embodiments of the present disclosure can be configured to indicate which entities have assumed various levels of responsibility for the attestations in or about messages. For example, as noted, an assurance service and its software may be configured to indicate various entities that offer indemnity, warranties, or other forms of guarantees in or about messages, such as the authenticity or reliability of a digital signature. As another example, the assurance service and its software can be configured to indicate various entities or systems upon which the presenter or recipient of the message can rely, such as a particular CA or a particular sender.

In some embodiments, the assurance software may be implemented as a browser extension or extension software, such as a Microsoft Outlook Extension. The assurance software can be implemented to indicate that an attester about a message is at least known, but not necessarily trusted by the presenter of the message. In addition, the assurance software can also indicate an indemnification relationship about the attester. Various parties may serve as attesters relating to the trustworthiness or reliability of a message and a user may have various trust relationships with these parties. For example, trusted introducers, certification authorities, various types of senders may be attesters in some form.

For purposes of illustration, embodiments of the present invention are described with reference to securing e-mail messages. Of course, e-mail is provided as an example and other forms of messaging, such as webmail, text messages, SMS, instant messages, are within the scope of the present disclosure. One skilled in the art will recognize that embodiments of the present invention can be implemented to any form of messaging, such as text messages, instant messages, telephone messages or calls, messages delivered orally, other forms of visual, or audio user interfaces, or other sensory user interfaces, etc.

In some embodiments, webmail services provide a user interface through a web browser on a computing system configured to expose user interface elements. The user interface elements that are controlled by the webmail provider are known as the webmail chrome, while the user interface elements controlled by senders of the e-mail may primarily pertain to the content of a message. In general, the chrome may refer to any user interface elements that border or frame the content of the message or a window including the message. It may be appreciated that the web browser also presents what is known as web browser chrome. Such web browser chrome is under the web browser's control, not the webpage's control (or webmail provider's control). For purposes of the following discussion, webmail chrome generally refers to the user interface elements under the messaging system's control, in distinction to the content of messages.

In the embodiments, the users can fully trust the chrome as much as they trust the messaging service, because the chrome is provided by the messaging service, i.e., the webmail provider. That is, users of the service can reasonably rely on the user interface elements to perform their intended functions according to the webmail provider, as the user trusts (relies upon) the webmail provider to do its job. For example, users that see the "Send" button may reasonably depend on pressing it to transmit the message under composition that is currently displayed by the messaging interface to any recipient listed in a recipient list. Likewise, users can reasonably depend on pressing the "Cancel" button would result in cancellation of the message's transmission. But, in the embodiments, the user does not need to have the same trust in the content, because the content can lie or mislead about its origin and safety. Instead, trust attestations may be included as part of the trusted part of the message's display, such as the chrome. The provider of messaging services can be a provider of any kind of communications service, such as a cell phone carrier (where the chrome comprises a display attached to a cellular phone), a website, a company's website, a healthcare website, and the like.

Although PKI is described above as a security technology; the embodiments may employ any form of security mechanisms. For example, the embodiments may employ various security features of the domain name system (DNS), such as DNS security extension (DNSSE), DomainKeys and DomainKeys Indentified Mail (DKIM), pretty good privacy (PGP) and webs of trust, and the like.

However, CAs record and present information in a relatively free-form fashion, despite standards that govern the location and formatting of said information. For example, as shown in FIGS. 2A-B, it is possible that certificates with the same technical fields and entries will correspond to different levels of verification and trustworthiness.

Reference will now be made in detail to the exemplary embodiments of the invention, which are illustrated in the accompanying drawings. Wherever possible, the same reference numbers will be used throughout the drawings to refer to the same or like parts.

In general, FIG. 1 shows an exemplary system. FIG. 1 shows an exemplary system consistent with embodiments of the present invention. FIG. 1 is intended as an example, and not as an architectural limitation for the embodiments described. As shown, a system 100 may comprise a network 102, a user computer 104, a messaging server 106, a CA server 108, and a sender computer 110 that is operated by a sender. These components will now be further described below. System 100 may include, however, additional servers, clients, and other devices not shown.

Network 102 serves as a communication infrastructure to support the communications between the other components of system 100, such as user 104, messaging server 106, and CA server 108. Such networks are well known to those skilled in the art including local area networks, metropolitan area networks, wide area networks, mobile communications networks (such as 3G networks), WiFi networks, and the like. In some embodiments, network 102 may comprise one or more networks of the Internet.

User computer 104 provides the hardware and software for a user to utilize the methods and systems of the embodiments. The user computer 104 may be implemented on well known devices, such as, personal computers, network computers, mobile phones, laptops, and the like. In the depicted example, user computer 104 may comprise the hardware, software and data (not shown), such as processors, memory, storage systems, boot files, operating system images, and applications (like a browser and browser extension). Furthermore, the user computer 104 may employ the Transmission Control Protocol/Internet Protocol (TCP/IP) suite of protocols to communicate with the other components of system 100.

Messaging server 106 provides services, for example, to user 104 related to messaging. For example, messaging server 106 may be one or more servers that implement an e-mail application. Such servers are well known to those skilled in the art. Of course, messaging server 106 may provide other services, such as account management, or other forms of messaging. In some embodiments, messaging server 106 may relate to well known e-mail services, such as MICROSOFT EXCHANGE™, or webmail services, such as YAHOO! MAIL™, GMAIL®, and the like.

Those skilled in the art will recognize that the embodiments may be implemented across different aspects of messaging systems. For example, although messaging server 106 may provide services related to messaging, various proxy servers and other network elements, such as firewalls, or other servers, may also modify the content of the messages. In these instances, the assurance service 112 and assurance software 114 may be configured to recognize when proxy servers or other network elements have modified a message's content and indicate these situations accordingly when providing information about attestations in or about the message. In another embodiment, the assurance software may run on a proxy server and other network elements on the communication path (such as in network 102) in between the messaging server 106 and the presenter. In such a case, the assurance software 114 can modify the chrome that the messaging server 106 transmits to the presenter, such as a web browser, for the presenter to display, or otherwise make available to users. Loopback transport via a localhost and VPN access also are possibilities in the embodiments, as described herein.

In the depicted example, messaging server 106 may comprise the hardware, software and data (not shown), such as processors, memory, storage systems, boot files, operating system images, and applications (like a web server). Furthermore, the messaging server 106 may employ the TCP/IP suite of protocols to communicate with the other components of system 100.

CA server 108 can serve as a third party that is trusted by both the user computer 104 and other entities of system 100, such as the sender, sender computer 110, etc. For example, user computer 104 and sender computer 110 may rely on the CA server 108 for attestations of particular kinds, for example, confirming each computer's identity and providing public keys of each computer, but not necessarily the user or the sender. In general, the CA server 108 confirms that each computer is in fact what it claims to be and then provides the public keys of each computer to the other. In some embodiments, the CA server 108 provides digital certificates and a PKI system that allows the user computer 104 and messaging server 106 to secure the user's messaging. For example, in some embodiments, the services of CA server 108 may enable the use of S/MIME by user 104 with a webmail application provided by messaging server 106.

In the depicted example, CA server 108 may comprise the hardware, software and data (not shown), such as processors, memory, storage systems, boot files, operating system images, and applications (like a web server). Furthermore, the CA server 108 may employ the TCP/IP suite of protocols to communicate with the other components of system 100.

Sender computer 104 provides the hardware and software for a sender to utilize the methods and systems of the embodiments. The sender computer 110 may be implemented on well known devices, such as, personal computers, network computers, mobile phones, laptops, and the like. In the depicted example, user computer 110 may comprise the hardware, software and data (not shown), such as processors, memory, storage systems, boot files, operating system images, and applications (like a browser and browser extension). Furthermore, the user computer 104 may employ the Transmission Control Protocol/Internet Protocol (TCP/IP) suite of protocols to communicate with the other components of system 100.

As also shown in FIG. 1, system 100 may further include an assurance service 112. The assurance service 112 represents any provider of assurance software and services for system 100. In one embodiment, the assurance service 112 may comprise the hardware, firmware, and software to provide a system of manipulating the chrome of a webmail platform to provide trust attestations, which are displayed on user computer 104. The trust attestations may be computed by various methods known in the art, including the use of public key cryptography and the PKI infrastructure, or scanning for content for certain indicia that are relatively secure up to a certain threshold, for example, computations made under the Sender Policy Framework, or by messaging server 106 having software using the DomainKeys/DKIM system.

In one embodiment, the assurance service 112 may provide the trust attestations are presented in a designated portion of the chrome of the messaging service 106 that is displayed on user computer 104. For example, the assurance service 112 may be implemented as software that runs on messaging server 106 and the trust attestations in the chrome are served up to the user computer 104 via techniques known in the art for delivery of client-server presentation data, such as an HTTP connection.

In another embodiment, the assurance service 112 may be implemented at least partially by software that runs on the user computer 104 and this client software may perform some computations on the user computer 104 in order to manipulate the messaging server 106 chrome. For example, the assurance service 112 may employ a web browser extension that is installed on a browser running on the user computer 104.

Figure 1A:
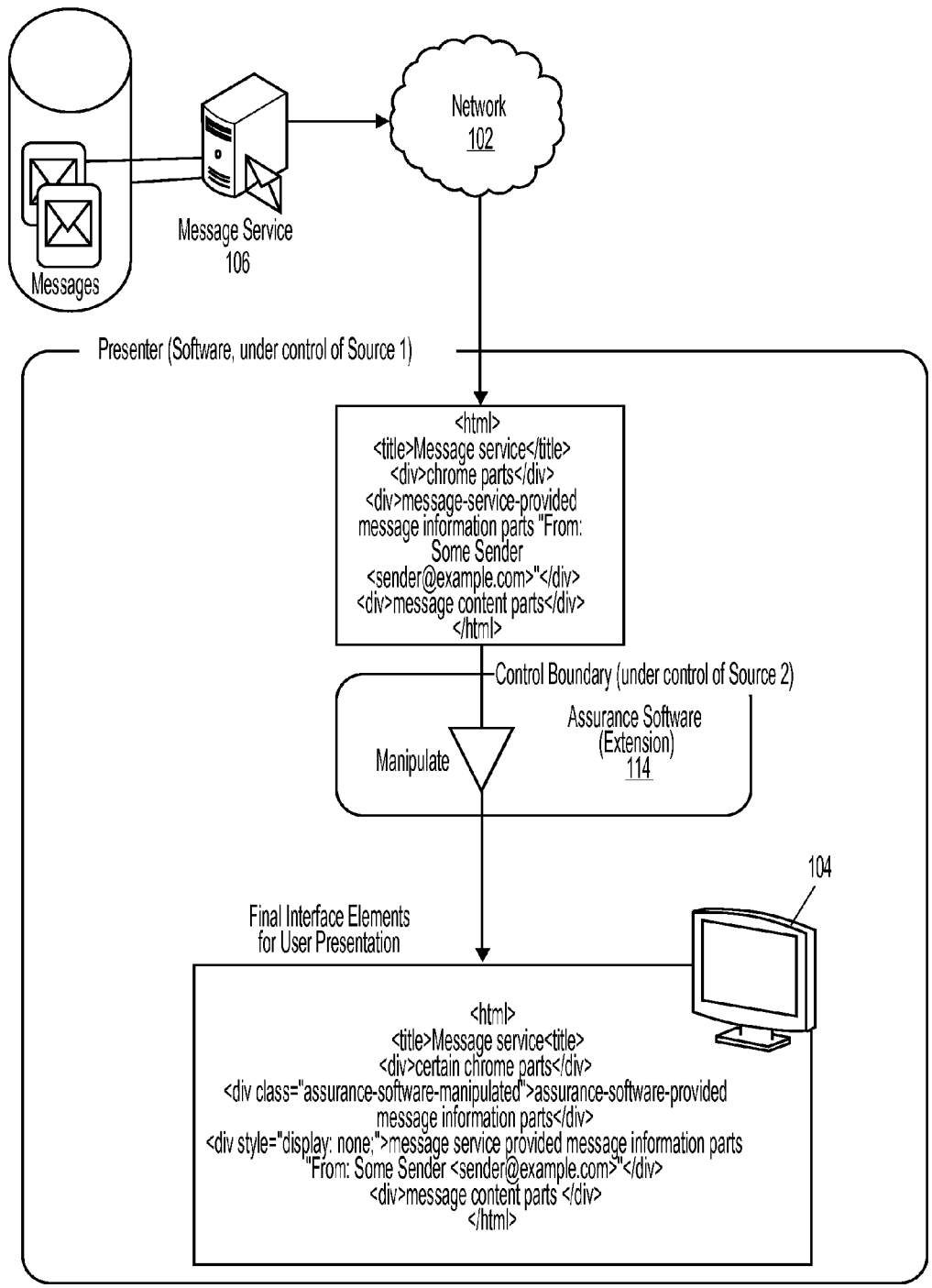
FIG. 1A shows exemplary operations of the system shown in FIG. 1 consistent with embodiments of the present disclosure.

FIG. 1A shows exemplary operations of the system shown in FIG. 1 consistent with embodiments of the present disclosure. As shown, messaging service 106 may provide via network 102 a message, such as a message in HTML format. Presenter software, such as a web browser, is under the control of the webmail service because it presents the webmail service's user interface elements, as webmail service chrome, inside of the content area of the web browser. The web browser content area is distinguished from the chrome of the web browser, although it may be appreciated by one with skill in the art that certain parts of the web browser chrome may be placed under partial or complete control of the content. For example, the URL bar can vary with the content, and can be changed via JavaScript calls; therefore the URL bar is can be at least partially under the control of the content. The presenter software may also be an e-mail client running on user computer 104, operating under the control of a manufacturer of the e-mail client. Examples of such e-mail clients include Microsoft Outlook, Outlook Express, Thunderbird, and Apple Mail. In addition, as shown, assurance software 114 may be under the control of a different entity or source, such as assurance service 112.

The assurance software 114 may be a browser extension or e-mail client extension that has been installed on the user computer 104. For example, Gmail by Google Inc. can be used with browser extensions, such as Gmail S/MIME 0.3.7. The Gmail S/MIME web browser extension can manipulate the chrome of Gmail. However, even the Gmail S/MIME extension has several deficiencies. For example, it does not determine a set of attestations about the message, because it does not perform the digital signature computation. Instead, the Gmail S/MIME extension dumps results on the display screen. Another deficiency of the Gmail S/MIME extension is that it does not present information about the set of attestations and does not have attestations. FireGPG is another web browser extension that can manipulate the chrome of Gmail (to present information using the PGP/GPG protocols and software), yet FireGPG also has similar deficiencies. For example, it does not determine a set of attestations about the message. Instead, FireGPG merely performs the digital signature computation without determining an attester or the reliability of the information presented (for example, with reference to an entity that is known, but not necessarily trusted by the assurance service, the assurance software, or the recipient of the message). Another deficiency of the FireGPG extension is that it does not present information about the set of attestations and does not have attestations. Accordingly, some embodiments are described herein that overcome the known browser extensions that are available, including Gmail S/MIME and FireGPG. For example, in some embodiments, the browser extension is configured to manipulate the chrome of the webmail service, like Gmail, and, among other things, may determine or provide various attestations about a message. Furthermore, it may be appreciated by those with skill in the art that the network 102 may support a loopback, wherein the messaging service 106 can operate on the same user computer as the presenter software. An example of such a system is Zimbra Desktop, where the messaging service runs as a local process and makes the messaging interface available on a local port via localhost. The messaging service obtains messages from local or remote message stores, (not shown), possibly accessed via further message service interfaces. The presenter software can be a customized web browser that is packaged with the messaging service, and is configured to operate solely with the messaging service.

In a further embodiment, the assurance software may operate in conjunction with a VPN client solution, configured to operate as remote presentation software. For example, a server service such as Microsoft Terminal Services, Cisco VPN client, or Citrix Presentation Server (XenApp) provides an application environment in which messaging software runs. In this case, messaging software refers to the e-mail client such as Microsoft Outlook, or a web browser viewing a webmail page, such as Internet Explorer, all via the remote presentation software. The remote presentation software therefore acts as presenter software in these embodiments. The remote presentation software is on the user's client computer and which communicates between the server service and the hardware on the user's client computer.

The assurance software may operate on the server, manipulating the messaging software's chrome as the chrome user interface elements are passed from the messaging software to the server software, for rendering onto the user's client computer through the remote presentation software. In such a case, the assurance software 112 puts the user interface elements under the control of the assurance software 112, between the messaging software and the server software.

The assurance software 112 may operate on the user's client computer 104, manipulating the chrome user interface elements (for example, changing the onscreen display) between the presenter software and the hardware to which the user interface is rendered.

As with a proxy implementation, the assurance software 112 may manipulate the chrome user interface elements between submission from the server software and reception by the client (presenter) software.

Pieces of the assurance software 112 may operate at various points of integration between the messaging software and the user. For example, a piece of the assurance software 112 may operate on the user's client computer 104, as an extension to the remote presentation software (presenter software), to control and log computations with direct access to the user's unencrypted private keys. A further piece of the assurance software 112 may operate on the server with the messaging software, performing certain user interface manipulations between the messaging software and the server software, while in communication with the first piece of the assurance software 112 with access to the private keys.

In a further embodiment, virtualization may be employed between the presenter and messaging software. Virtualization software includes Microsoft Virtual PC and VMware Workstation, where the software creates a computing environment that emulates hardware to the guest operating system. In operation, the virtualization software creates an emulated graphics system and converts calls to that graphics system into system calls native to the underlying hardware or host operating system. In some embodiments, the assurance software 112 may be configured to operate as an extension to or part of the virtualization software, so that the assurance software 112 overlays or replaces user interface elements in accordance with the principles of the invention. For example, a virtual graphics card can employ driver software that converts guest OS graphics API calls into a rendered image, but the driver software may merely convert those calls into calls that the virtualization software hypervisor understands as graphic primitives, so that the hypervisor calls the corresponding host OS primitives. In such a case, the hypervisor (via the driver) is aware that messaging software, such as Microsoft Outlook, is making these calls.

In this case, the assurance software 112 may operate alongside or in the hypervisor. For example, the assurance software 112 can detect that the virtualized Microsoft Outlook is making graphics calls. The assurance software 112 may then augment the Microsoft Outlook graphics calls after recognizing the presence of the message, which it may determine by looking at the GDI calls and the corresponding controls and the names of those controls (such as window names and UI configurations). The assurance software 112 may determine the source of the message, for message digest computation, by interrogating the OUTLOOK.EXE process using the hypervisor's ability to examine the contents of memory of any process. Alternatively, the assurance software 112 may determine the source of the message by making guest OS system calls from the hypervisor (which may emulate a phantom process whose goal is to communicate with processes in the virtualized OS) using MAPI to get the corresponding message source. Optionally, the assurance software 112 may also correlate the message source with the source onscreen to confirm that the message displayed is the same message in question.

The assurance software 112 may then make the corresponding graphics calls into the host operating system or host hardware to render the attestations in proximity to the message, and to manipulate the message in conformity with the attestations. The assurance software 112 may also (or alternatively) make the graphics calls into the guest operating system or into OUTLOOK.EXE (the message software). In the latter case, just as in the case of injecting HTML elements into webmail web pages, the message software may be aware of the operation of the assurance service 112. Nevertheless, if the messaging software does not tamper with the attestations and other user interface elements, the user may come to rely on the assurance software 112 as the source of the attestations, and therefore, the messaging software vendor need not worry about liability associated with making those attestations. It is one advantage of the assurance software 112 operating across the virtualization boundary that the assurance software need not be installed in the guest operating system. It can be another further advantage that the assurance software 112 may have access to private keying material without the guest operating system having access to that material.

In a further embodiment, the assurance software 112 may operate on the presenter software itself to present attestations respecting the content that the presenter is presenting, including content that may act as chrome in certain contexts. For example, a web browser contains browser chrome, but may also contain webmail chrome, which from the perspective of the web browser, is merely web browser content. It may appreciated that in the following discussion, "chrome" may apply to web browser chrome, where the manipulated web browser chrome presents attestations with respect to web browser content (and therefore, attestations concerning the web page or other content that the user is viewing), or with respect to the messaging software content area (and therefore a message) within some of the web browser content. In the case of VPN or remote presentation software, the assurance software manipulates the presenter chrome (such as a menu bar or toolbar of the presentation window) for the manipulated presenter chrome to present attestations with respect to the remote content (and therefore, attestations concerning the remote server that the user is viewing), or with respect to the messaging software content area (and therefore a message) within some of the remote content. Nevertheless for purposes of the continued discussion, "chrome" can refer to the user interface elements under the messaging system's control, in distinction to the content of messages. Webmail chrome is an example of such chrome.

Accordingly, during operation, the message may be presented to the user and may have one or more user interface elements associated with it. For example, as shown in FIG. 1A, the message may be displayed based on its HTML encoding and may have one or more user interface elements associated with it. Collectively, a web page containing at least part of the message and the user interface elements would be possible. In addition, the assurance software 114 may provide its own user interface elements, such as an information bar, that can indicate a variety of information about attestations made in or about the message. FIGS. 3-9 are provided to show exemplary screen shots of various user interface elements that a user can use to interact with one or more messages and user interface elements under the control of assurance software to indicate information and attestations concerning the messages.

FIGS. 2A-B shows certificates from two different providers, with different formats for similar types of information. One skilled in the art will recognize that other formats of certificates may be utilized and analyzed by the embodiments in order to determine the trustworthiness or reliability of a message.

In some embodiments, the assurance service 112 and the CA operating CA server 108 may be related by in various ways, such as a contractual relationship in which the CA indemnifies the assurance service 112 in whole and in part from claims brought by users of the messaging server 106. In other words, if the users suffer harm in reliance upon the assertions presented by the assurance service 112, then the CA may provide various forms of compensation or corrective actions. These forms of compensation or corrective actions may be contingent upon the assurance service 112 presenting its attestations in accordance with, for example, CA policies like a Certification Practices Statement (CPS) and reasonable inferences drawn from the CPS and from the actual practices of the CA. An attestation, however, is an assertion made by a particular attester, which is as reliable as the attester is deemed to be reliable. Because the CA may be familiar with providing assurance services, the assurance service 112 may rely on the CA's policies to provide attestations about messages in system 100. Of course, distribution of liability and forms of compensation between the CA and the assurance service 112 may depend on a variety of factors.

In one embodiment, these factors include:
a) whether the CA provided the assurance service 112 with advance notice of changes to the CA's CPS or of the CA's actual practices,
b) notification by either party of any merger, acquisition, or change in control,
c) notification of any loss of private keying material (such as, for a PKI CA) or loss of control over an identity database, or
d) knowledge by the assurance service 112 of actual flaws with documented exploits in software distributed by the assurance service 112 that has not been corrected after a reasonable time, provided that the webmail provider or end user did not fail to install patches made available by the assurance service 112 within a reasonable time.

It may be appreciated that the relationship between the assurance service 112 and the CA may be expressed or implied in fact by the statements of a CA's published Certification Practices Statement to members of the public. In such a case, an explicit contractual relationship may not be strictly necessary, as the assurance service and software may reasonably rely on the CA's statements just as any member of the public would. Alternatively, the relationship may be implemented based on automatic system actions that are enforced by the system 100. In one embodiment, the assurance service 112 maintains relationships with a plurality of messaging providers, a plurality of CAs and CA servers 108, or both.

One advantage of the assurance service 112 and its software is that they may present enhanced degrees of assuring statements in the chrome of messaging server 106 based upon the assertions embodied in data provided by the CA. For example, for an organizational entity, software from assurance service 112 may present an attestation in the chrome such as:

According to Certificate Authority, Cola Bottling Company of City, State WY, a State corporation,
at e-mail address marketing@cola.com sent this message
(still valid as of today).
Better Business Bureau data Details . . . .

In one embodiment, the CA may further secure relationships with its subscribers in which allocation of the risk of loss or damage to third parties, such as the assurance service 112 is distributed. For example, an organizational subscriber granted the benefit of enhanced degrees of assuring statements may indemnify the CA (and thereby all other indemnified entities down the chain) for damages that may flow from the subscriber's use or misuse of the certificate or indicia on file with the CA.

In one embodiment, the relevant parties may disclaim liability if the computing system upon which the user runs the software by the assurance service 112 or views the web pages served by messaging server 106 is infected with malicious software, which may subvert the display or presentation of assurance data on the user computer 104.

It may be appreciated that the responsibility, warranty, reliance, or indemnification relationships may include with them various legal rights and indemnity relationships known in the art. Other advantages of the embodiments may be apparent. For example, it may be appreciated that given the final disposition of liability as reallocated under the embodiments of described herein; each party may seek insurance to protect themselves against the reallocated risk of damage. Furthermore, it may be appreciated that by limiting or eliminating the residual liability of system 100, there may be an encouragement of the adoption of authenticated communications. Furthermore, it may be appreciated that by limiting or eliminating the residual liability of messaging server 106, the operators of messaging server 106 may be encouraged to adopt additional products and services for securing messages, such as encrypted e-mail and to provide those products and services to their customers, for example, by reselling those products and services offered by the operators of the assurance service 112.

In some embodiments, the assurance service 112 may be useful in monitoring the activities of the messaging server 106. For example, in an embodiment, the browser running on the user computer 104 can include an extension embodying some features of the assurance service 112. This extension may be any software that modifies the browser's behavior: examples of such technology include "Browser Helper Objects" for Microsoft Internet Explorer and "Extensions" for Mozilla Firefox. In some embodiments, the extension can mediate any necessary encrypting, decrypting, signing, and verifying procedures. The extension may monitor unprivileged code from the messaging server 106 for insecure behavior, and may supply some of interface elements on the user computer 104 to notify the user if this behavior is detected. If some preferences of the user are stored non-locally, such as on the messaging server 106, the extension can sign and optionally encrypt such preferences to prevent tampering and optionally to ensure confidentiality. Thus, the assurance service 112 can bootstrap and track trust relationships between users, messaging services, and senders of messages.

In one embodiment, the presentation of assurance data in the chrome appears as follows: According to Certificate Authority:

an individual named_John_Smith_
with the e-mail address jsmith@example.com sent this message
(still valid as of today).

Such a display is meant to indicate valuable information to the user, and cause the user to make a trust decision. In this sense, the system may alter user behavior.

As can be seen, the assurance service 112 can be the carrier of the assurance data and may be a different party than the one operating the messaging server 106. A CA is an attester (or one assurer of many assurers, presented by the assurance software 114 made by the assurance service 112), upon which a user may base his or her trust decision if he or she finds that CA is a reliable determiner of the identity of senders of e-mail. The presentation may include one or more trademarks, which are used by the public to identify the origin and integrity of messages and associated products and services, including assurance and identity data.

If the CA is to be trusted, there are reasonable grounds to believe that an individual with the given name John and the family name Smith with an e-mail address jsmith@example.com. In some embodiments, there are reasonable grounds to believe that the CA continues to provide reasonable grounds to believe this data as of today (based on some mechanism for follow-up checking as for example by OCSP or CRL checking, which is akin to a credit-issuing entity performing a follow-up check on a credit-requesting entity by examining the credit-requesting entity's credit report). Should the user wish to investigate more details about the CA's reliability or attestations, the user may click a link such as "Details" to obtain more information from the CA of these assertions.

It may be appreciated that a Certificate Authority (CA) is any entity that provides a relatively unforgeable or secure list of assertions regarding the identities of certain senders of communications, and that in one embodiment, a CA corresponds to a CA in a public-key infrastructure. Furthermore, a CA need not use PKI, but may instead provide a database of senders and indicia of said senders by other means. For example, a non-PKI CA may provide a service by which the non-PKI CA obtains and verifies the handwritten signatures of subscribers, and on request compares the handwritten signature on a particular message with the handwritten signature in the non-PKI CA's repository of handwritten signatures and names to identify the named person or entity as the originator of a message.

In alternative embodiments, the details of the CA's assertions and reliability may be provided by a link on the CA indicia directly rather than a separate link. The identity of the messenger may be inferred contextually rather than via a trademark, as for example coloring the assurance chrome area with a visually distinct color or by emitting distinct sounds through an audio device on the computing system.

FIGS. 3, 3A, 3B, 3C, and 3D show exemplary screen shots of various user interfaces that can be used by a user to view one or more of their messages. As shown in these Figures, the assurance software 114 may provide various forms of information in user interface elements to indicate attestations in or about the message.

Figure 3:
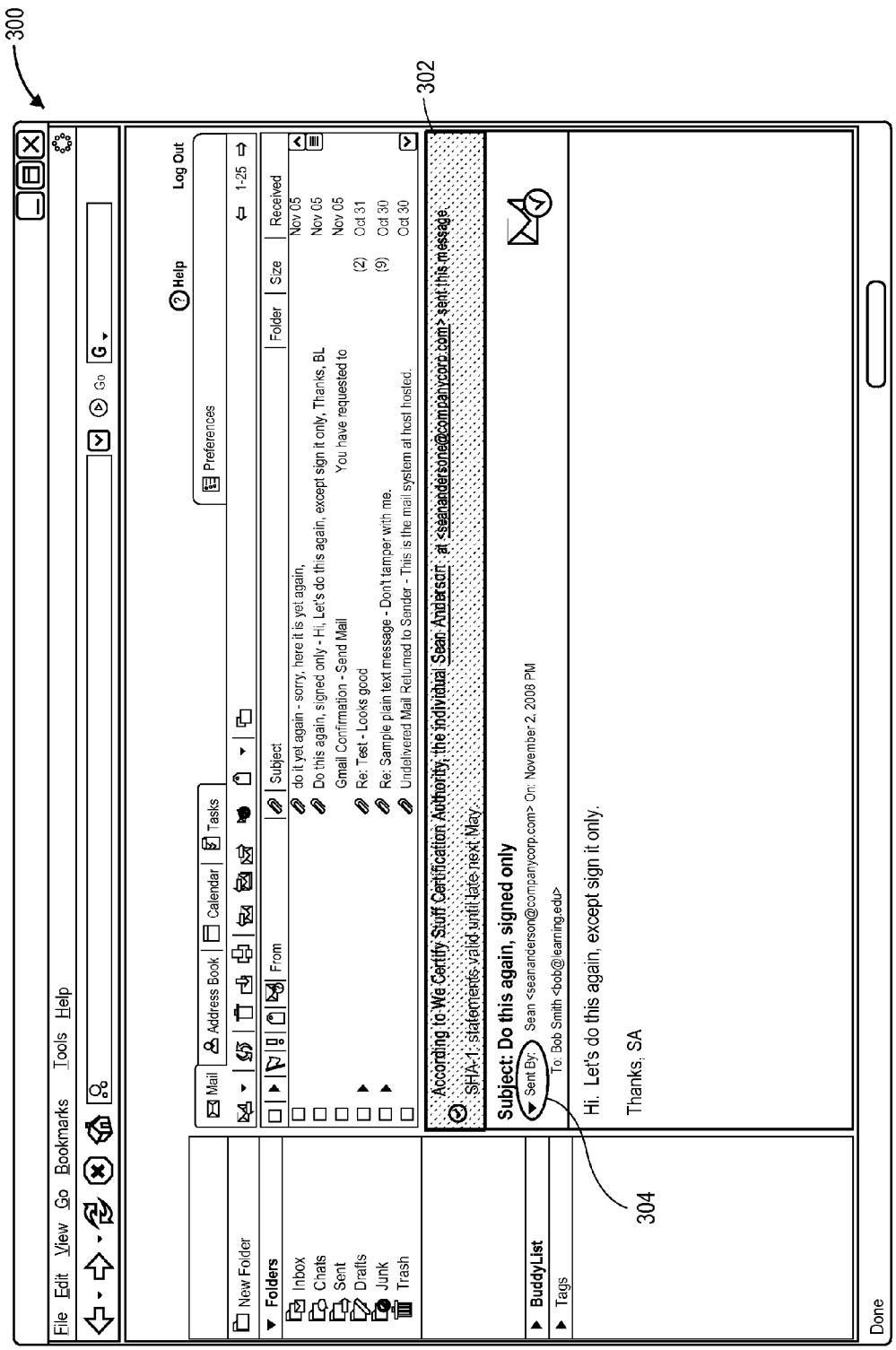
FIGS. 3, 3A, and 3B show exemplary screen shots of various user interfaces that can be used by a user to view one or more of their messages.
Figure 3A:
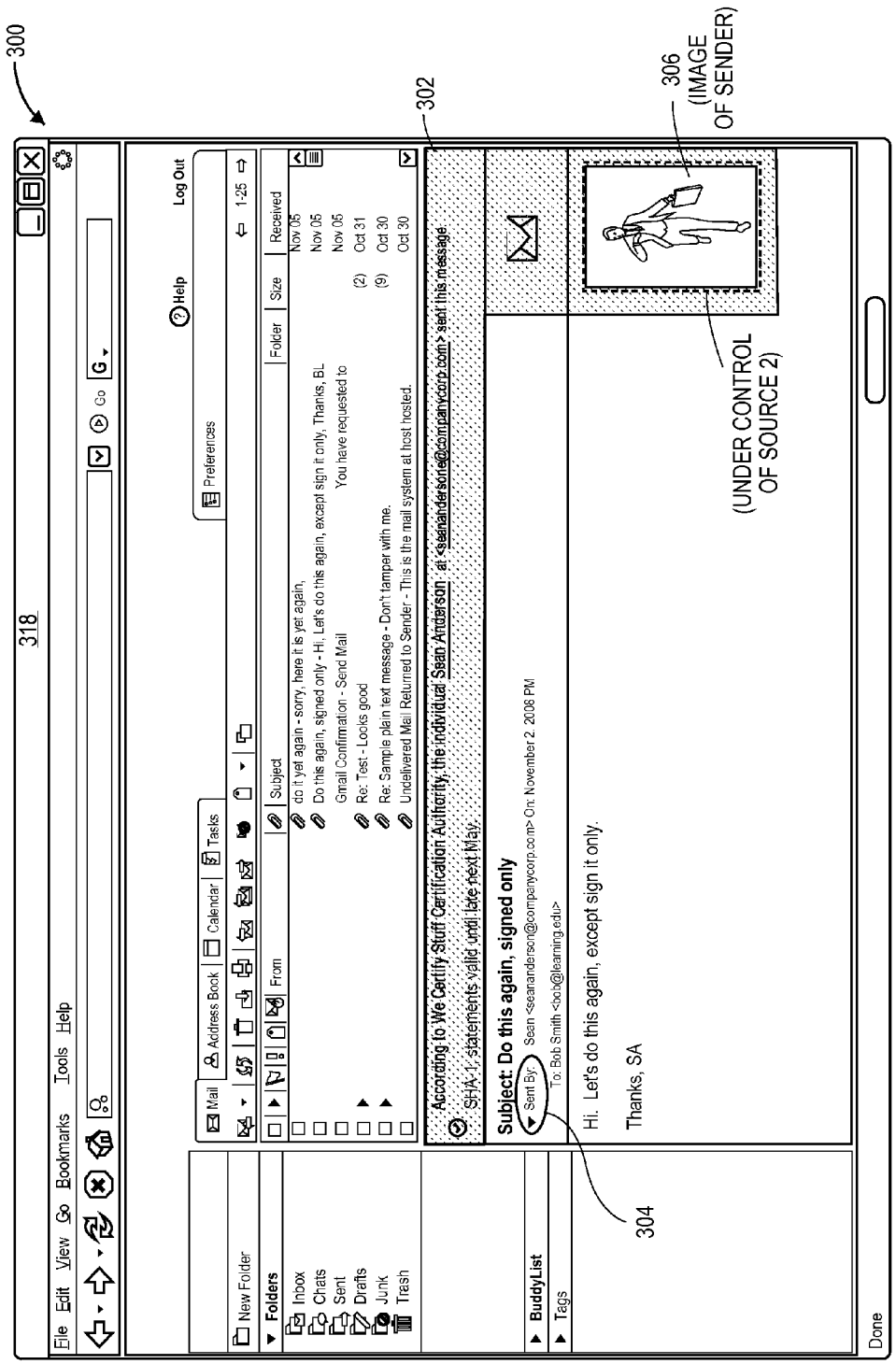
Figure 3B:
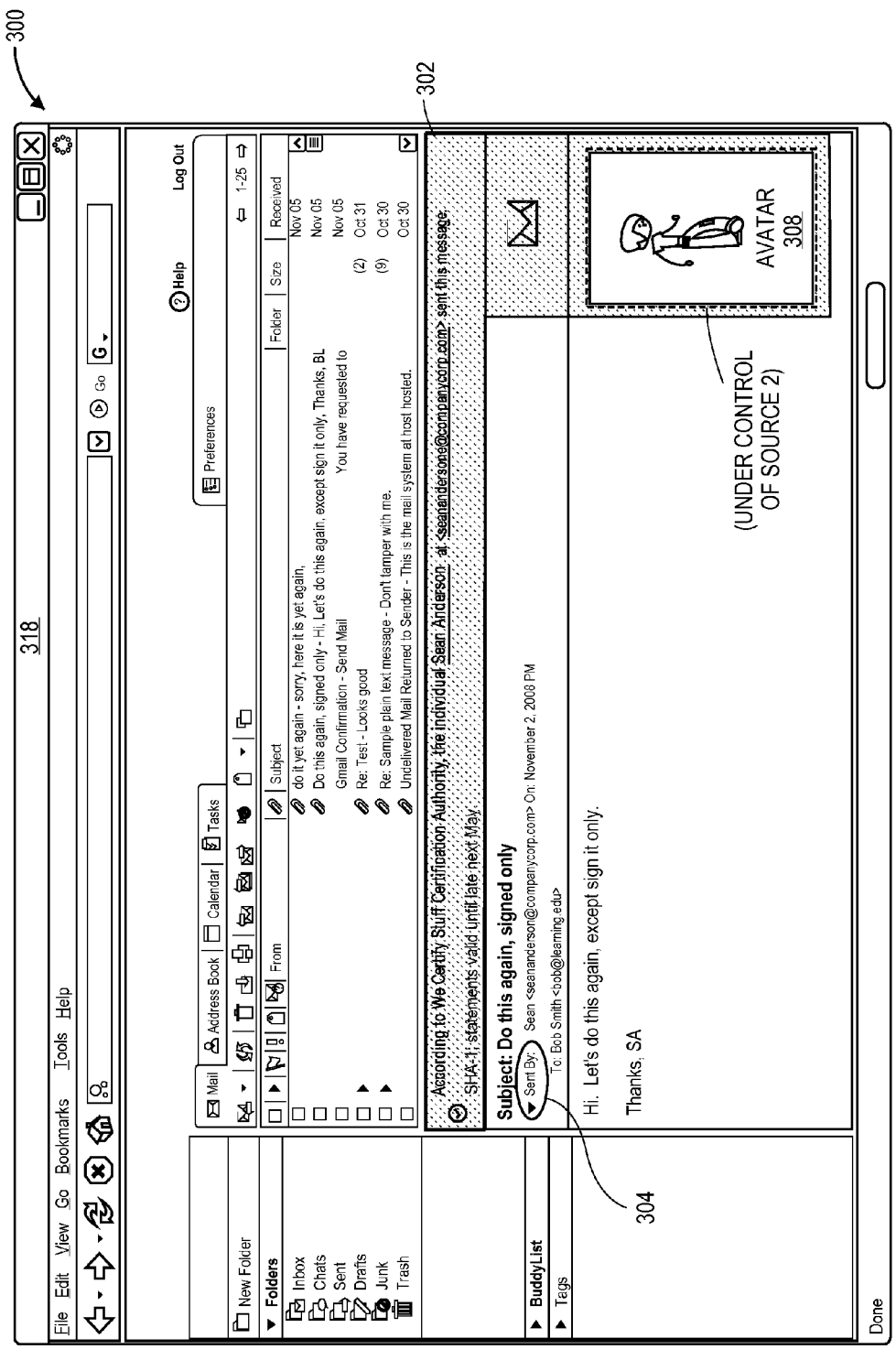

For example, in FIG. 3, the messaging server 106 may provide a user interface, such as a web page 300 that is displayed on the user computer 104. The web page 300 may comprise various user interface elements, such as a tool bar, web browser chrome 318, etc., that is under the control of the messaging server 106. In addition, another user interface element 302 may be displayed in or near the web page 300. This user interface element 302 may be under the control of a second source, such as the assurance service 112 or the assurance software 114.

For purposes of illustration, the user interface element 302 may appear as part of the chrome of the web page 300. In the example shown in FIG. 3, the user interface element 302 may indicate various aspects of the attestations, such as information about CA server 108 or the CA that operates CA server 108, the sender of the message, and whether any entity is willing to claim responsibility, liability, or indemnity for the attestations. In addition, the user interface element 302 may indicate who will be able to read the contents of the message, for example, if the message has been encrypted. As an example, the user interface element 302 shown in FIG. 3 may include as its attestation the statement: "According to We Certify Stuff Certification Authority, the individual Sean Anderson at <seananderson@companycorp.com> sent this message. SHA-1 statements valid until late next May." One skilled in the art will recognize that these attestations may be formatted or stated in various ways to indicate various aspects about a message.

Furthermore, to help identify that the user interface element 302 is under the control of a source other than the presenter, the user interface element 302 may be configured to be visually prominent in order help the user understand the trustworthiness or reliability of the attestations and the message. The visual prominence may distinguish the control or a difference in control of the source of the assurance data from the control of the messaging service. For example, the user interface element 302 may include a logo or other indicator. The user interface element 302 may also be distinguished in other forms, such as by a different color, font, or location, to indicate this difference in control.

Furthermore, the user interface element 302 may employ multimedia, such as an animation clip, audio clip, display of a distinctive image, or popup display of an image in order to visualize and indicate to the user that the user interface element 302 is under the control of a different source than the web page 300. For example, referring now to FIG. 3A, the user interface element 302 may display or popup an image that is representative of the sender of the message or someone associated with the message. As another example, referring now to FIG. 3B, the user interface element 302 may display or popup an image that can be associated with the sender of the message or someone associated with the message. In particular, this distinctive image may be a logo, avatar, a mascot or character that can be associated with some entity of the message, and the like. Those skilled in the art will recognize other variations of the user interface elements that are under the control of assurance software 114 or assurance service 112. In addition, those skilled in the art will recognize that user interface elements 302 and 308 may be placed in various locations within a message, for example, to assist in helping a recipient to easily identify the source of an attestation. For example, the user interface elements 302 and 308 may remain under the control of attestation service 112 and may include various highlighting or display features to emphasize its appearance.

Figure 3C:
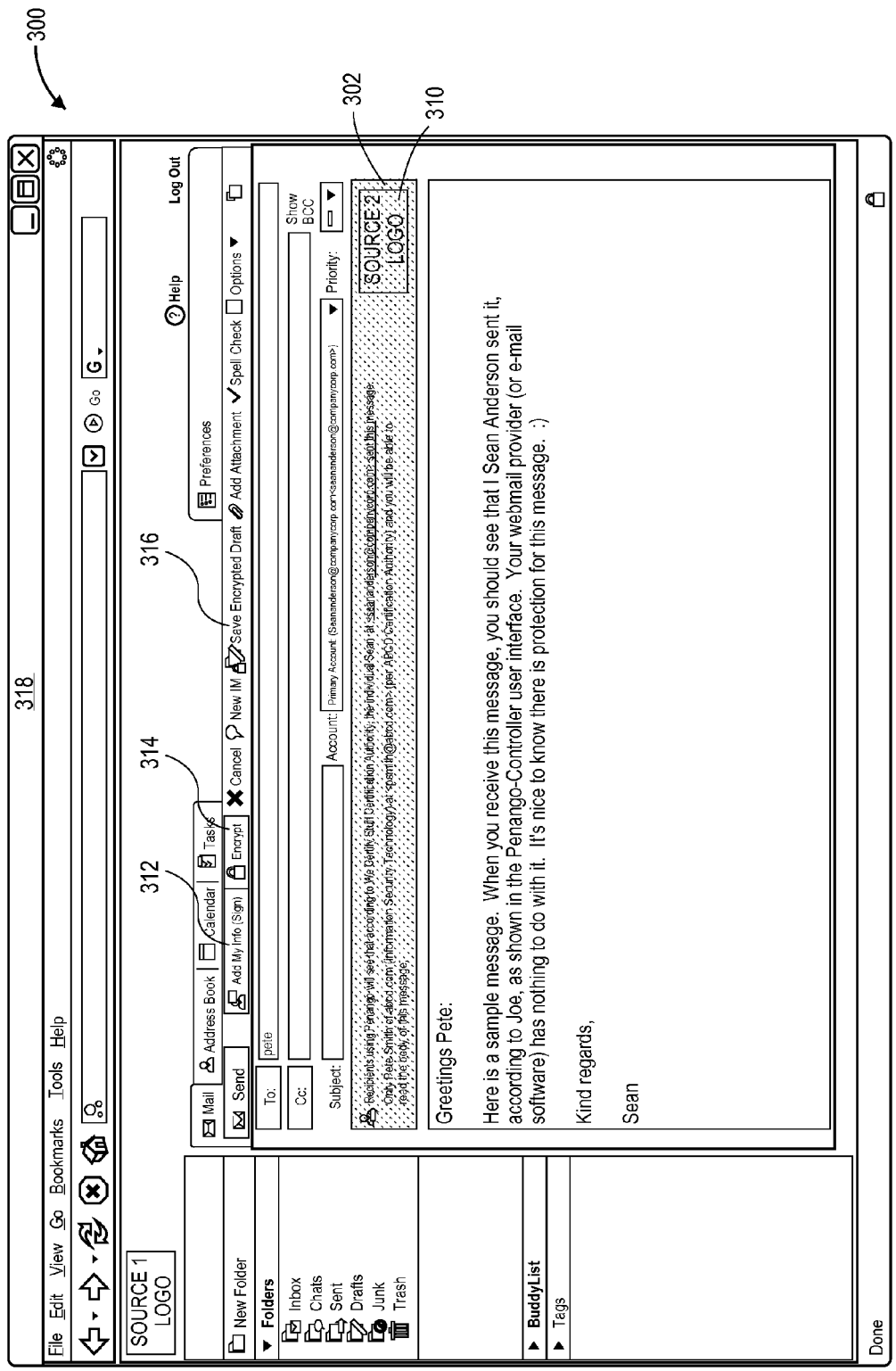
FIGS. 3C and 3D show exemplary screen shots of various user interfaces that can be used by a user to compose one or more messages.

FIG. 3C shows another example of how a message may be composed by a user. In particular, as shown in FIG. 3C, the messaging server 106 may serve as the presenter of a message via a web page 300. To help indicate that the messaging server 106 is the source that controls web page 300, the page may include a logo or other indicator to indicate that page 300 is under the control of a particular source. For example, in FIG. 3C, the page 300 may include a "SOURCE 1 LOGO" that indicates which entity controls the page.

In addition, the page 300 may include a second user interface element 302 that is under the control of a second source, such as attestation service 112 or its software 114. To indicate this difference in control, the user interface element 302 may be displayed in a different color or shading. In addition, as shown in FIG. 3C, the user interface element 302 can include a logo or other indicator, such as "SOURCE 2 LOGO," 304 to indicate that another source has control over the user interface element 302.

One skilled in the art will recognize that other user interface elements may be under the control of assurance service 112 or its software 114. For example, user interface buttons for "Add My Info (Sign)" 306, "Encrypt" 308, and "Save Encrypted Draft" 310 may be user interface elements that are under the control of the assurance service 112 or its software 114 because they may relate to how the message's trustworthiness or reliability is indicated to the recipient of the message.

Figure 3D:
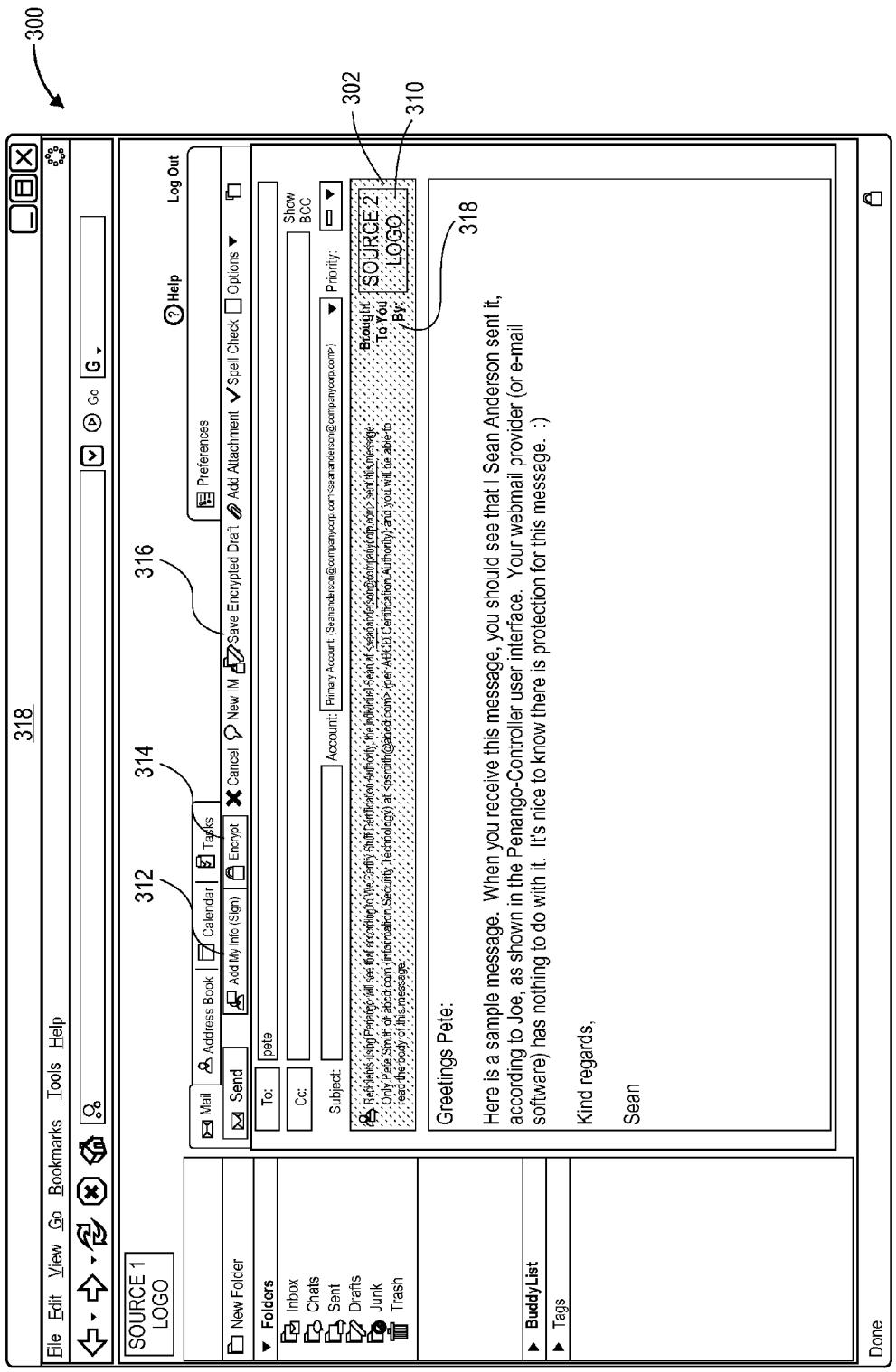

FIG. 3D shows a variation of how a message may be composed by a user. In particular, as shown in FIG. 3D, the messaging server 106 may serve as the presenter of a message via a web page 300. To help indicate that the messaging server 106 is the source that controls web page 300, the page may include a logo or other indicator to indicate that page 300 is under the control of a particular source. For example, in FIG. 3D, the page 300 may include a "SOURCE 1 LOGO" that indicates which entity controls the page, e.g., the messaging server 106.

In addition, the page 300 may include a second user interface element 302 that is under the control of a second source, such as assurance service 112 or its software 114. To indicate this difference in control, the user interface element 302 may be displayed in a different color or shading. In addition, as shown in FIG. 3D, the user interface element 302 can include a logo or other indicator, such as "Brought to you by," and "SOURCE 2 LOGO," to indicate that another source has control over the user interface element 302.

As shown in FIG. 3D, the user interface element 302 may include an attestation that states, for example, "Recipients using Penango will see (according to We Certify Stuff Certification Authority) the individual Sean Anderson at <seananderson@companycorp.com> sent this message. Only Pete Smith of abcd.com (Information Secure Technology) at psmith@abcd.com (per ABCD Certification Authority) and you will be able to read the body of this message." As noted, this statement is merely provided as an example to indicate the type of information that may be included as an attestation within the user interface element 302. One skilled in the art will recognize that various information and entities may be identified to varying degrees. For example, a person may be identified by their first and last name. However, if a person is known or trusted by the sender or recipient, a person in the attestation may be merely identified by their first or last name alone, such as Bob, Pete, or Jones, or by some other form of abbreviation, such as initials, nicknames, etc.

Figure 4:
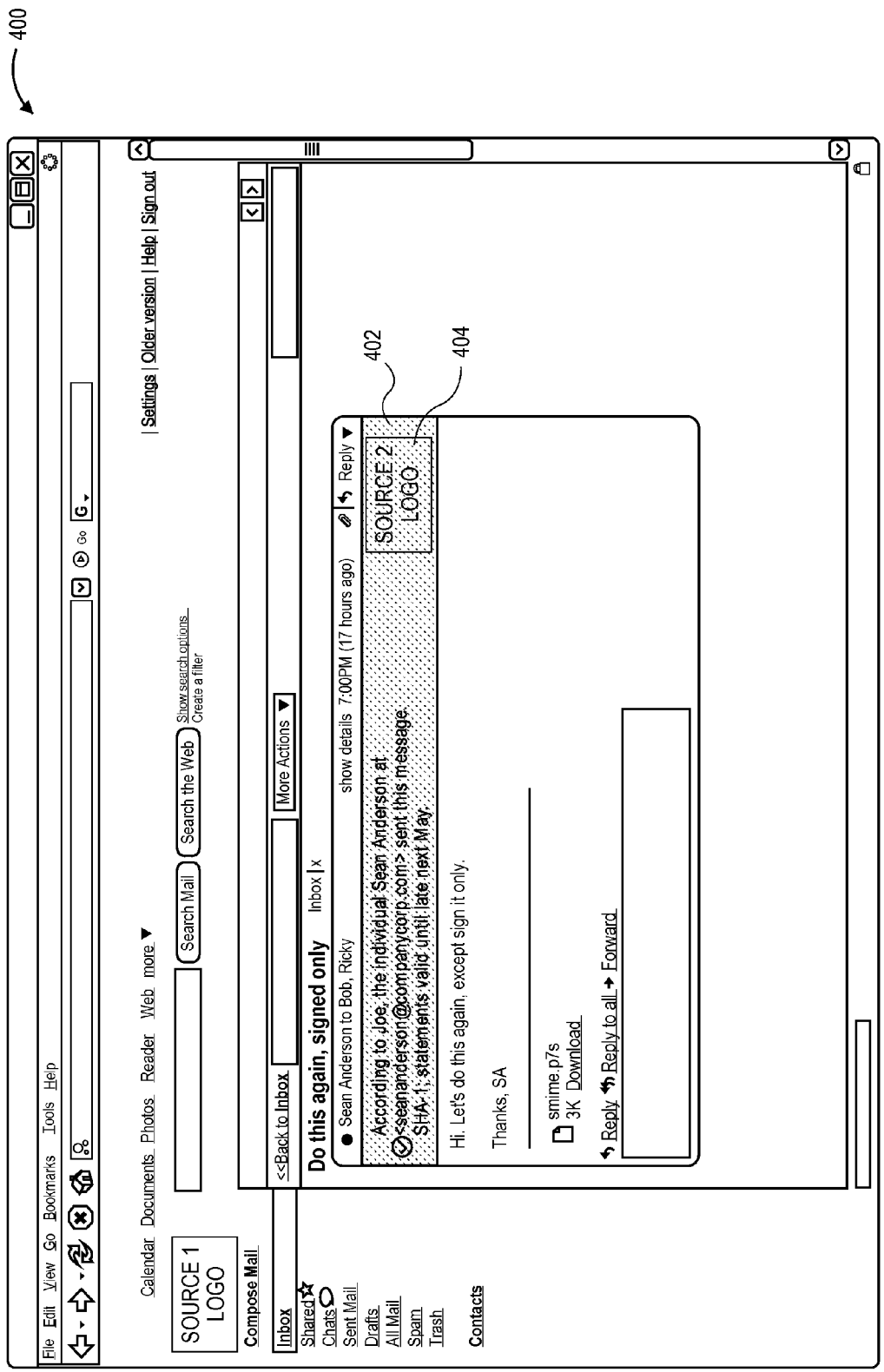
FIG. 4 shows another exemplary screen shot of a user interface that can be used by a user to view one or more of their messages.

FIG. 4 illustrates another example of how a message may be displayed to a user. In particular, the messaging server 106 may present the message via a web page 400 for display on the user computer 104. In addition, the page 600 can include a user interface element 402 that is under the control of another source, such as the assurance service 112 or the assurance software 114. As shown, the user interface element 402 may include a statement about the trustworthiness of the message, such as, "According to Joe, the individual Sean Anderson at <seananderson@companycorp.com> sent this message. SHA 1 statements valid until late next May." The user interface element 402 may further include a logo or other indicator, such as, "SOURCE 2 LOGO," to indicate that it is under the control of another source that is different from the presenter of the message.

Figure 5:
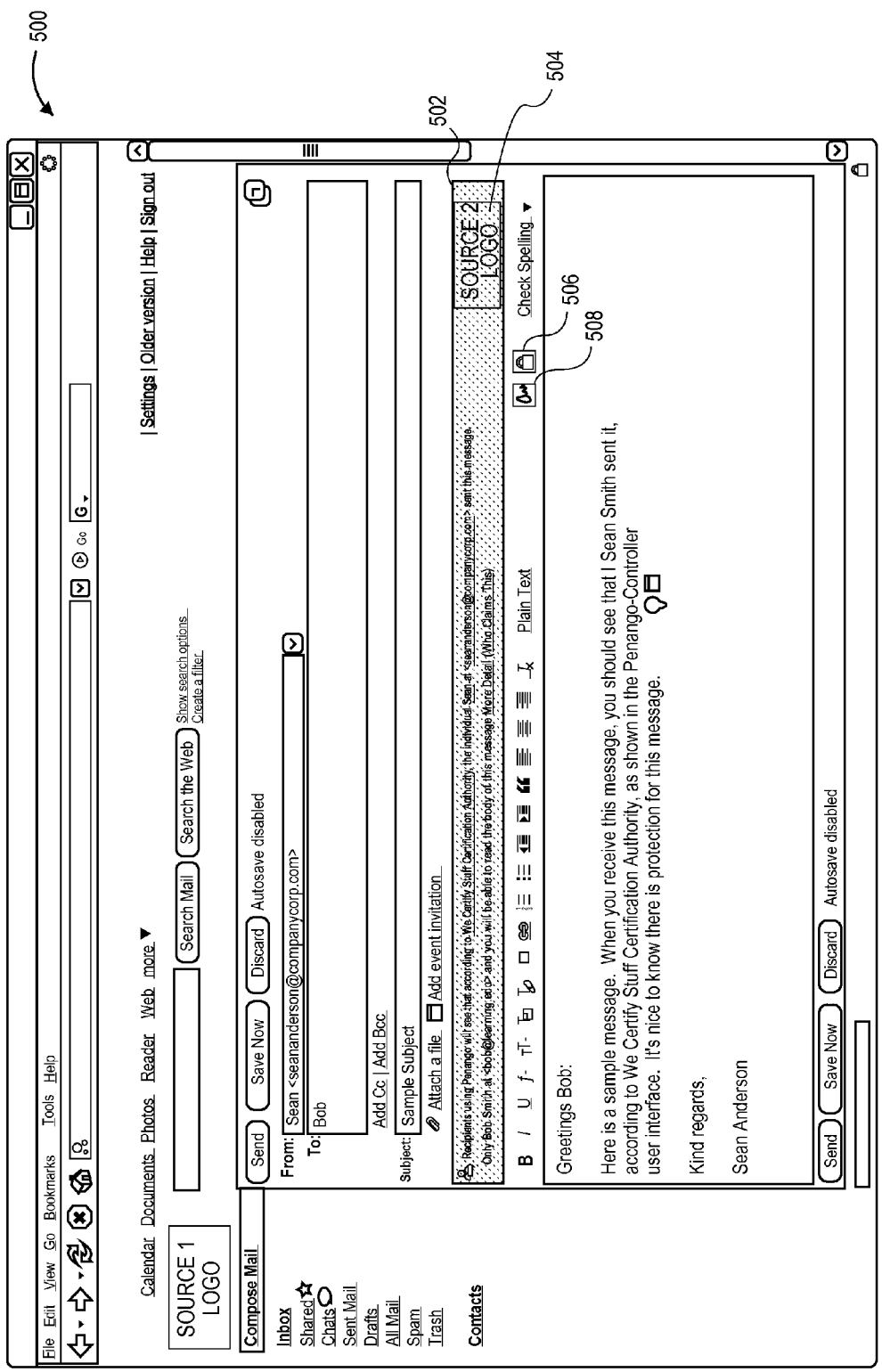
FIG. 5 shows an exemplary screen shot of various user interfaces that can be used by a user to compose one or more messages.

FIGS. 5, 5A, and 5B show exemplary screen shots of various user interfaces that can be used by a user to compose one or more messages. In particular, a message may be composed in a page 500. Page 500 may further comprise a user interface element 502, which is under the control of a second source, such as the assurance service 112 or the assurance software 114. The user interface element 502 can include a statement about the trustworthiness or reliability of the message, such as, "Recipients using Penango will see that according to We Certify Stuff Certification Authority, the individual Sean at <seananderson@companycorp.com> sent this message. Only Bob Smith at <bob@learning.edu> and you will be able to read the body of this message." As noted, the information in this statement may be used to control the operation of assurance service 112 and its software 114 in assisting in the delivery of this message.

In some embodiments, the user interface element 502 may include a link to other resources so that a user can further investigate the attestation. For example, as shown, the user interface element 502 may comprise a link labeled, "Who Claims This," to allow the user to investigate who or what is making the attestation. Of course, one skilled in the art will recognize that the user interface element 502 may include a variety of resources, such as multiple URLs, logos, and the like, as a resource to the user. For example, as also shown in FIG. 5, the user may request "More Detail," about the attestation. This feature thus allows the user interface element 502 to flexibly include, exclude, or abbreviate certain information in its attestations. Such a feature may be useful to help the user interface element 502 accommodate different levels of statements, different display sizes, and different types of information.

In addition to element 502, other user interface elements, such as buttons 504 and 506, may under the control of a second source. For example, buttons 504 and 506 may relate respectively to signing and encrypting the message when it is sent. Since these features may relate to the trustworthiness or reliability of the message, these buttons 504 and 506 may thus be under the control of assurance service 112 or its software 114. One skilled in the art will recognize that embodiments also allow for other interface elements to be under the control of a second or different source. For example, user interface elements relating to encryption, auto-save, and sending of a message may be under the control of a second source.

In embodiments, the system may present and combine indicia from multiple attesters, which are used by the assurance service 112 and the assurance software 114. For example, a signed message may be countersigned by a time stamping authority (TSA), whose countersignature provides evidence that a message and signature existed at least as early as the signing date. As another example, CAs may offer update services, such as certificate revocation lists and online certificate status protocol servers, to warn of the trustworthiness of particular underlying certificates if a private key is reported as compromised.

Figure 6:
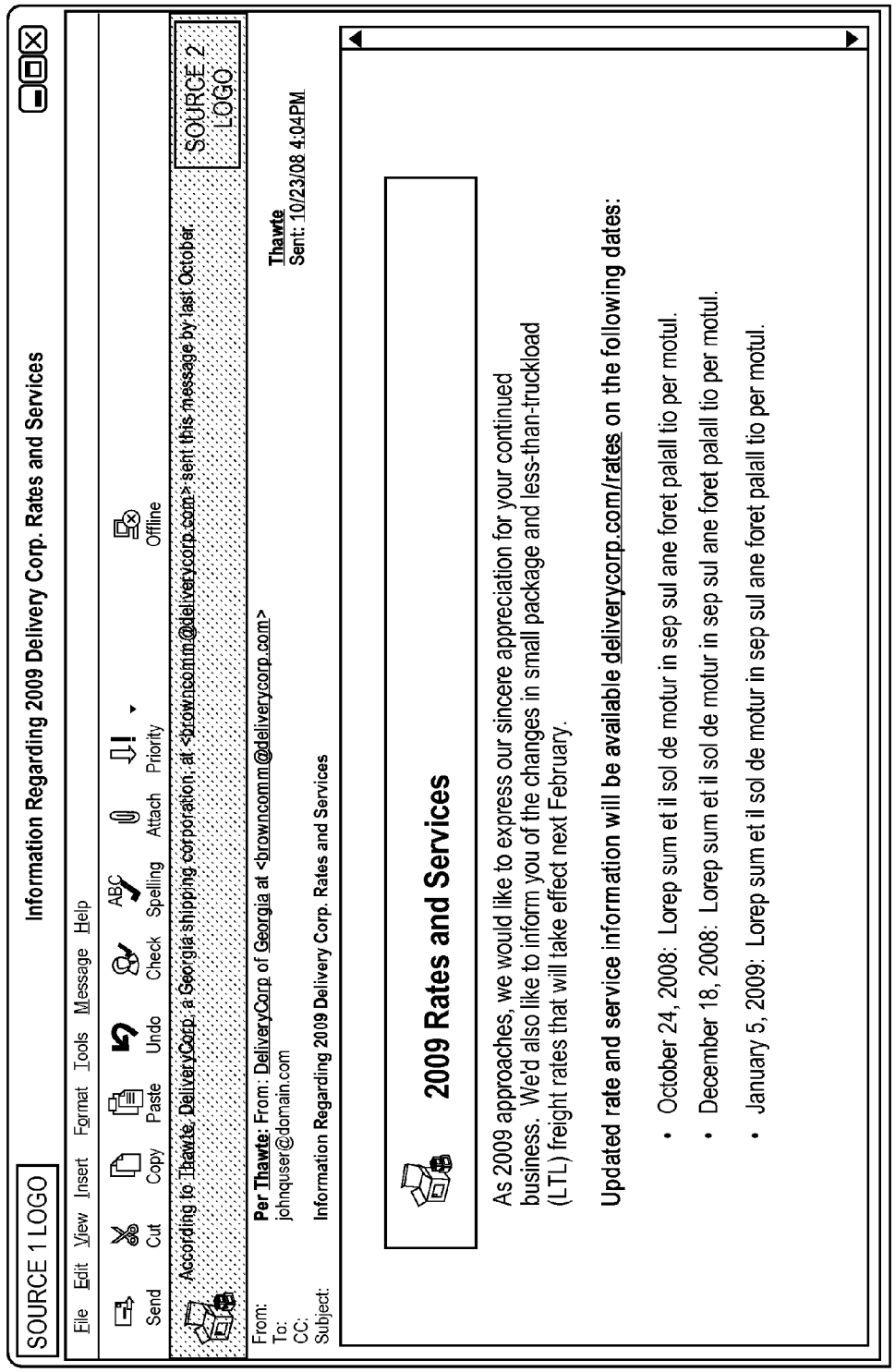
FIG. 6 shows an exemplary screen shot of a user interface of an e-mail client that can be implemented by embodiments of the present invention.

In other embodiments, assurance service 112 and assurance software 114 can be implemented in various forms into e-mail clients. For example, FIG. 6 shows an exemplary screen shot of a user interface of an e-mail client that can be implemented by embodiments of the present invention. As shown, embodiments may provide a user interface element 602 that is under the control of assurance service 112 and assurance software 114. The element 602 may be similarly implemented as described above. For example, the element 602 may comprise an attestation indicating the trustworthiness of the message and one or more entities associated with the message, such as the sender or CA. In addition, the element 602 may comprise one or more logos that indicate the source of its control. Of course, the element 602 may employ other forms of multimedia, such as video and audio. For example, a video clip that uniquely identifies a sender of a message or an entity that makes an attestation about the message may be used in the element 602.

Figure 7:
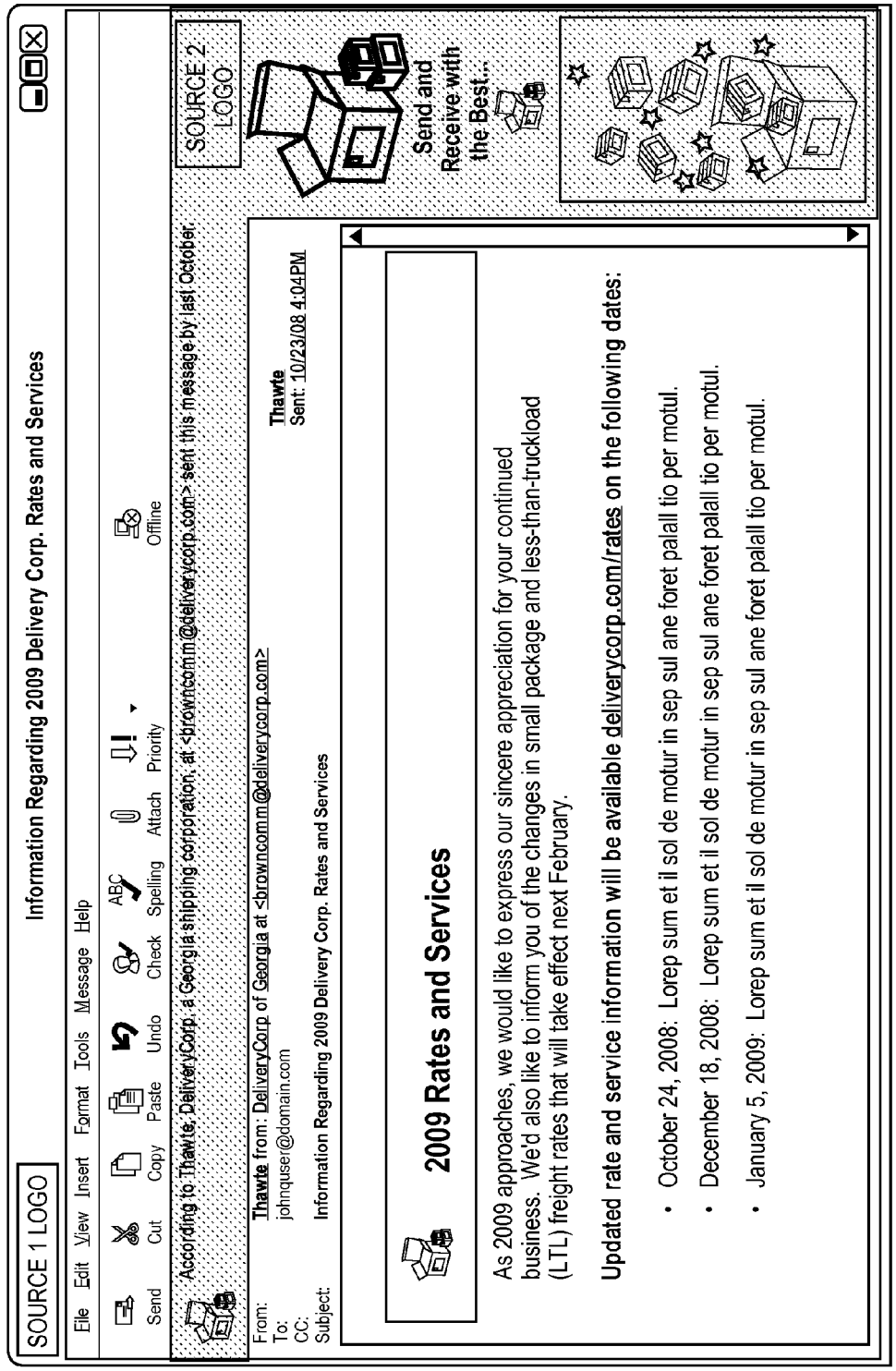
FIG. 7 shows another exemplary screen shot of a user interface of an e-mail client that can be implemented by embodiments of the present invention.

FIG. 7 shows another exemplary screen shot of a user interface of an e-mail client that can be implemented by embodiments of the present invention. As shown, a user interface element 702 may be under the control of assurance service 112 and assurance software 114 and may comprise a horizontal toolbar portion and a sidebar portion. In some instances, the element 702 may use the sidebar to provide additional information to a reader or recipient of the message. For example, the sidebar may provide additional space that allows for a video clip that is intended to uniquely identify the sender or an entity making an attestation about the element. The video may used for identification purposes and may also include content that attracts the attention of the viewer. Accordingly, the viewer may then devote more attention to the other content of the element 702, such as the attestation provided in the toolbar portion. The sidebar portion of element 702 may also comprise other information, such as text or tagline that is memorable or attracts the attention of the reader or recipient.

The embodiments of the present disclosure are configured to recognize that the time that the sender composes and signs a message is relevant to the question of whether the sender's signatures are trustworthy or reliable for the purpose of identifying the sender of the message. The trustworthiness of a message relates to whether the reliability of a signature as evidence that the signer is the holder of the private key and actually is the entity that sent the message. For example, an otherwise trustworthy sender may lose his, her, or its corresponding private key at time t. After time t, no signatures are trustworthy. Yet an attacker (an untrustworthy sender) can forge evidence of the date, making a message appear as if it were signed before t. Thus, in some embodiments, independent evidence can be provided that messages were composed before t in order to verify the trustworthiness of a particular message. It may be appreciated that in some embodiments, for the purpose of time-stamping, a message can include the actual message content, one or more digital signatures (or representations thereof, such as cryptographic hash values equating to the same), and indeed any other information, so that all of the actual message content, its purported signer, and any other information may be verified as existing by the time t.

The embodiments may rely on one or more of the types of evidence that can be employed by the assurance software. The sender can procure a cryptographic time stamp from a third-party TSA. The recipient's receiving mail server may stamp the message with the date of receipt in a Received line. The receiving server can generate a cryptographic time stamp, acting as its own TSA. The receiving server can procure a cryptographic time stamp from a high-security coprocessor, acting as its own TSA. The receiving server can procure a cryptographic time stamp from a third-party TSA. The recipient can annotate or countersign the message with the user's private key, where the annotation or countersignature contains a time stamp according to the user, and while the message is otherwise known to be trustworthy. An annotation or countersignature may be appended by use of a self-addressed reply message referencing the original message, or a mechanism such as a flag or a label that the server exposes to clients to let clients add custom data to messages.

As an alternative to a digital signature, the user as the recipient can also annotate the message itself to attest respecting other aspects about the message, such as the trustworthiness or the sender's trustworthiness.

In other embodiments, the system 100 may utilize information indirectly derived in order to evaluate the trustworthiness or reliability of a message. For example, the system 100 may analyze information in online certificate status protocol (OCSP) messages. Such messages can be used to indicate the current status of a digital certificate and whether the certificate has been revoked. The system 100 may use various parts of the information in OCSP messages, such as one or more time stamps, to make an evaluation of whether a message is trustworthy or reliable. In addition, the system 100 may employ a hash of the message, or a hash of the message including a time stamp, such as from an OCSP message, in order to make its determinations.

In one embodiment, the system relies on a response from any digital signer that acts as a neutral, independent, unbiased source of time with respect to responses that it issues, and that permits the inclusion of requestor-specified data in its response. A corresponding system from the sender's end would request such a response from the neutral third-party. Even though the neutral third-party is not purported or held out to be a time-stamp authority (TSA), so long as the signer is obligated to produce accurate time, it may be relied upon.

In one embodiment, a system for the procuring of reliable evidence of the time submits an Online Certificate Status Protocol (OCSP) request. The request includes certain information, such as a SEQUENCE of requests with certificate ID structures, each containing a hash algorithm, the issuer name hash, the issuer key hash, and the serial number of the alleged certificate. Optionally, a nonce for the request is included as one of the requestExtensions. An OCSP server (OCSP responder) returns a signed response. The signed response can include information respecting the OCSP responder itself, the time at which the response was produced, the Certificate IDs provided by the requestor, and optionally, the nonce of the request. Such a request and response cycle is illustrated below.

Example of OCSP request and response cycle.

```
OCSP Request Data:
    Version: 1 (0x0)
    Requestor List:
        Certificate ID:
            Hash Algorithm: sha1 <-- CAN BE HASH ALGORITHM OF MESSAGE
            Issuer Name Hash: DEADBEEFE271B9518326761CF21D4E33576A8370 <--
CAN BE HASH OF MESSAGE
            Issuer Key Hash: DEADBEEF4C8813F078D98977B56DC589DFBCB17A <--
CAN BE HASH OF MESSAGE
            Serial Number: DEADBEEF74202438B197F1C9DE2E3610        <-- CAN BE
HASH OF MESSAGE
    Request Extensions:
        OCSP Nonce:
            DEADBEEFB3A991077B364693A4D6AAF01576        <-- CAN BE HASH OF
MESSAGE, INDEED, MESSAGE ITSELF
            <-- OTHER DATA CAN GO HERE.
OCSP Response Data:
    OCSP Response Status: successful (0x0)
    Response Type: Basic OCSP Response
    Version: 1 (0x0)
    Responder Id: C = XX, ST = XXX, L = XXXX, O = Cert., CN = Class 1 OCSP,
emailAddress = support@cert.org
    Produced At: Oct 20 20:10:00 2008 GMT <-- HIGHLY PROBATIVE EVIDENCE
OF EXISTENCE OF RECORD AT THIS TIME
    Responses:
    Certificate ID:
        Hash Algorithm: sha1
        Issuer Name Hash: DEADBEEFE271B9518326761CF21D4E33576A8370
        Issuer Key Hash: DEADBEEF4C8813F078D98977B56DC589DFBCB17A
        Serial Number: DEADBEEF74202438B197F1C9DE2E3610
        Cert Status: unknown        <-- PROBATIVE EVIDENCE THAT CERT ID
```

-continued

CORRESPONDS NOT TO A REAL CERT (and thus to a message)
    This Update: Oct 20 20:10:00 2008 GMT    <- PROBATIVE EVIDENCE OF EXISTENCE OF RECORD AFTER THIS TIME
    Next Update: Oct 20 20:20:00 2008 GMT    <- PROBATIVE EVIDENCE OF EXISTENCE OF RECORD BEFORE THIS TIME
    Response Extensions:
        OCSP Nonce:
            DEADBEEFB3A991077B364693A4D6AAF01576
Certificate:
    Data:
        Version:
        Serial Number: 00000 (00000)
        Signature Algorithm: sha1WithRSAEncryption
        Issuer: O=Root CA, OU=http://www.cacert.org, CN=CA Cert Signing Authority/emailAddress=support@cacert.org
        Validity
            Not Before: Aug 22 07:13:00 2006 GMT
            Not After : Aug 22 07:13:00 2011 GMT
        Subject: C=XX, ST=XXX, L=XXX, O=Cert., CN=Class 1 OCSP
          emailAddress= support@certificationauthority.org
        Subject Public Key Info:
            Public Key Algorithm: rsaEncryption
            RSA Public Key: (1024 bit)
                Modulus (1024 bit):
                    00:e1:8d:ff:c8:17:9e:de:e6:91:fd:91:80:1c:0a ...:
                Exponent: 65537 (0x10001)
        X509v3 extensions:
            X509v3 Basic Constraints: critical
                CA:FALSE
            X509v3 Extended Key Usage:
                TLS Web Client Authentication, TLS Web Server Authentication, OCSP Signing <- PROBATIVE OF THE FACT THAT THIS IS A REGULAR BUSINESS RECORD GENERATING SERVER OF THIS TYPE
            X509v3 Subject Alternative Name:
                email: support@certificationauthority.org Example of a COMBINED OCSP REQUEST/RESPONSE CYCLE.

OCSP Request Data:
    Version: 1 (0x0)
    Requestor List:
        Certificate ID: <- A GOOD CERTIFICATE EXAMPLE
          Hash Algorithm: sha1
          Issuer Name Hash: 0000621693A6DA5AD0B98D3A135E35D1EB183661
          Issuer Key Hash: 000071604C8813F078D98977B56DC589DFBCB17A
          Serial Number: 123A
        Certificate ID: <- A BAD CERTIFICATE (REVOKED) EXAMPLE
          Hash Algorithm: sha1
          Issuer Name Hash: 0000621693A6DA5AD0B98D3A135E35D1EB183661
          Issuer Key Hash: 000071604C8813F078D98977B56DC589DFBCB17A
          Serial Number: 123B
        Certificate ID: <- A FAKE CERT ID THAT ACTUALLY CONTAINS THE MESSAGE HASH
          Hash Algorithm:
          Issuer Name Hash: CAFEBABEE271B9518326761CF21D4E33576A8370
          Issuer Key Hash: CAFEBABE4C8813F078D98977B56DC589DFBCB17A
          Serial Number: CAFEBABE74202438B197F1C9DE2E3610 <- COMPARE THIS "FAKE" SERIAL NUMBER (ACTUALLY MESSAGE HASH) WITH THE SERIAL NUMBERS ABOVE; IT IS NOT IN THE SAME FORMAT FOR THIS CA
    Request Extensions:
        OCSP Nonce:
            CAFEBABEF9BF1550C638C0CF47F561C27CFF
OCSP Response Data:
    OCSP Response Status: successful (0x0)
    Response Type: Basic OCSP Response
    Version: 1 (0x0)
    Responder Id: C = XX, ST = XXX, L = XXX, O = Cert., CN = Class 1 OCSP, emailAddress = support@certificationauthority.org
    Produced At: Oct 20 23:09:00 2008 GMT
    Responses:
    Certificate ID:
      Hash Algorithm: sha1
      Issuer Name Hash: 0000621693A6DA5AD0B98D3A135E35D1EB183661

```
        Issuer Key Hash: 000071604C8813F078D98977B56DC589DFBCB17A
        Serial Number: 321A
      Cert Status: good <- PROBATIVE EVIDENCE THAT CERT ID CORRESPONDS
TO A REAL CERT KNOWN TO AND PROBABLY ISSUED BY THIS CA (and thus
NOT to a message)
      This Update: Oct 20 20:43:00 2008 GMT
      Next Update: Oct 20 23:19:00 2008 GMT
      Certificate ID:
        Hash Algorithm: sha1
        Issuer Name Hash: 0000621693A6DA5AD0B98D3A135E35D1EB183661
        Issuer Key Hash: 000071604C8813F078D98977B56DC589DFBCB17A
        Serial Number: 321B
      Cert Status: revoked       <- PROBATIVE EVIDENCE THAT CERT ID
CORRESPONDS TO A REAL CERT KNOWN TO AND PROBABLY ISSUED BY
THIS CA (and thus NOT to a message)
      Revocation Time: Oct 03 16:53:00 2008 GMT
      This Update: Oct 20 20:43:00 2008 GMT
      Next Update: Oct 20 23:19:00 2008 GMT
      Certificate ID:
        Hash Algorithm: sha1
        Issuer Name Hash: CAFEBABEE271B9518326761CF21D4E33576A8370
        Issuer Key Hash: CAFEBABE4C8813F078D98977B56DC589DFBCB17A
        Serial Number: CAFEBABE74202438B197F1C9DE2E3610
      Cert Status: unknown       <- PROBATIVE EVIDENCE THAT CERT ID
CORRESPONDS NOT TO A REAL CERT (and thus to a message)
      This Update: Oct 20 23:09:00 2008 GMT
      Next Update: Oct 20 23:19:00 2008 GMT
      Response Extensions:
        OCSP Nonce:
            CAFEBABEF9BF1550C638C0CF47F561C27CFF         <-       POSSIBLE
LOCATION OF MESSAGE HASH
Certificate:
    Data:
        Version: 3 (0x2)
        Serial Number: 00000 (00000)
        Signature Algorithm: sha1WithRSAEncryption
        Issuer:    O=Root    CA,    OU=XX,    CN=XX    Cert    Signing
Authority/emailAddress=support@certificationauthority.org
        Validity
            Not Before: Aug 22 07:13:00 2006 GMT
            Not After : Aug 22 07:13:00 2011 GMT
        Subject: C=XX, ST=XXX, L=XXX, O=Cert., CN=Class 1 OCSP/emailAddress=
support@certificationauthority.org
        Subject Public Key Info:
            Public Key Algorithm: rsaEncryption
            RSA Public Key: (1024 bit)
                Modulus (1024 bit):
                    ....:
                Exponent: 65537 (0x10001)
        X509v3 extensions:
            X509v3 Basic Constraints: critical
                CA:FALSE
            X509v3 Extended Key Usage:
                TLS Web Client Authentication, TLS Web Server Authentication, OCSP
Signing
            X509v3 Subject Alternative Name:
                email:support@certificationauthority.org
    Signature Algorithm: sha1WithRSAEncryption
```

The system generating the request produces an OCSP request, but replaces the user-supplied request information with the message hash or with a structure otherwise unambiguously identifying the message. This may include other stand-ins for the message, such as the hash of the Signerinfo block used in S/MIME and PKCS #7/CMS containing the message digest (or hash) of the encapsulated MIME message, or even the entire Signerinfo block or entire message itself. For example, the issuer name hash, issuer key hash, serial number, or nonce may be replaced with the hash. The issuer name hash and issuer key hash are generally constrained to the hash algorithm choice in the particular cert ID structure to be valid, but the requestor may choose to generate an appropriate hash representing the message using the hash identified by the algorithm that the requestor records there. The certificate serial number is generally constrained to the ASN.1 type INTEGER, which is sufficient for encoding the hash value (and possibly the algorithm choice) into a numeric value. The nonce is encoded in an extnValue which is the ASN.1 type OCTET STRING, and thus is theoretically unbounded. The entire message could be placed in the OCTET STRING, depending on the implementation and practical considerations. The extnValue for the nonce may include both the message (or its representation and optionally the corresponding hash algorithm identifier, if ambiguous) and a piece of random data that actually serves as a nonce, to obtain the freshness guarantees that nonces are supposed to provide. To avoid detection by the OCSP server of the requestor's attempt to introduce a non-OCSP-related hash into the nonce, the requestor may avoid putting non-random-looking data (i.e., the algorithm identifier) into the nonce, but instead using the algorithm information in the certID as a basis for identifying the algorithm corresponding to the message hash value. In any event, the message hash may be placed anywhere in the OCSP request (such as in a new extension), as long as the OCSP responder signs it in its response.

The corresponding system that verifies this information obtains the OCSP response associated to the message via the various methods for associating described herein. In an exemplary embodiment, if the sender procures the OCSP response, one such place to put the OCSP response is in the RevocationInfoChoices structure of a SignedData structure of PKCS #7 or CMS, comprising part of an S/MIME message. One skilled in the art may identify this insertion as "OCSP stapling." When the verifying system analyzes the OCSP response, it checks for the presence of the message hash in any of the aforementioned areas. If placed in one of the certID structures, the OCSP responder's status response for that certID will probably be "unknown", since there is no issuer name, issuer key, or serial number with that hash on record. Nevertheless, that status response may be ignored, or may be used as probative evidence with respect to the reliability of the OCSP response. For instance, if the requestor requested certificate IDs of certificates that actually exist (and the CA is still maintaining records of them), the expected responses would be "good" or "revoked." In contrast, the expected response is "unknown" for a requestor's request of a certificateID containing a message or representation thereof. If the OCSP responder responds "good" (or even "revoked") to the request for a certID where the certID contains message data, either the OCSP responder is unreliable (i.e., lying or negligently misrepresenting the status of certIDs for which certificates do not actually exist), or there is a hash collision, indicating more serious problems with the cryptographic proofs.

If in the nonce, the verifying system will extract the hash value (or indeed, the message itself) from the nonce OCTET STRING and possibly the algorithm choice as well, or it may infer it from other parts of the OCSP response. Having found and equated the message or its representation with the message at issue, the system concludes that the message existed at time t and therefore one could reasonably conclude that the message was sent or received (depending on the information stamped) close to that time as well. The system may then generate indicia pursuant to this conclusion, such as those in FIG. 5C.

The OCSP responses, although not literally served as TSAs, are nevertheless reliable and admissible into evidence in broad ranges of circumstances. Under the Rules of Federal Evidence, for example, such OCSP response records are partially hearsay and partially non-hearsay. First, they are relevant to the issue of the message's existence, because the presence of the cryptographic hash value inside the response, coupled with the producedAt and thisUpdate time stamps, tends to show that the message existed by those times. The truth at issue is whether the requestor was in possession of a message at the time. Though the nonce may literally indicate "the message is NOT the hash 01234567," if 01234567 can be shown as only originating from the message digest function that shows it to be unique with respect to the message with a high degree of probability, the mere existence of 01234567 tends to prove that the message corresponding to 01234567 existed, and that 01234567 is the hash of that message.

Nevertheless, the existence of the complete OCSP response is hearsay, because the OCSP response claims to be generated a particular time and therefore must be offered for the truth of that matter declared therein. Yet the OCSP response may be a record of regularly conducted activity, and therefore may fall under the "business record exception" to the general rule that hearsay is inadmissible. The OCSP response is a report, record, or data compilation of acts ("someone made a request"), events ("someone made a request"), conditions ("certificate associated with ID is or is not revoked, or is unknown"), and opinions ("certificate is revoked due to alleged non-compliance with CA policies"), made at the time from information transmitted by a person with knowledge (i.e., the CA as a reliable organizational entity), kept in the course of a regularly conducted business activity (providing certificate status and signing each response with a private key that is kept under the control of the CA via the OCSP responder).

For an OCSP responder under the control of a CA to repudiate the purported truth that the response was generated at that time, the CA would have to deny that it (through its mechanical agent, the OCSP responder) signed the record, or that it failed to keep accurate track of time at least at one point during the OCSP's lifetime. But a reliable CA that maintains a reliable OCSP service would not be able to repudiate these propositions, without also repudiating the trustworthiness of all other responses that the OCSP has made. Such repudiation, though possible, could violate its Certification Practices Statement (CPS) and therefore would cause the CA to go out of compliance with the declarations made to and approved by its auditors (such as WebTrust). Furthermore, the requestor may elicit additional corroboration by requesting the OCSP server for status of certificate IDs actually in existence and known generally to be "good" or "revoked" (as opposed to "unknown"). The response of the OCSP server "good" for a certificate actually issued and active, would be probative that the OCSP server's response was generated during a "good" period of the certificate, bounded at least on the early end by the time at which the actual certificate was issued. Certificate expiration and archive cutoff dates may assist in bounding the later time as further corroborating evidence. Furthermore, a CA generally must keep and maintain accurate time with respect to the dates of issuance and expiration in certificates that they issue, in order to be reasonably reliable, to comply with its own CPS, and to retain the approval of its auditors (such as WebTrust).

In some embodiments, a digital timestamp may be employed by the assurance service 112 or assurance software 114 because it can be used without necessary having to make attestations about the content of a message. For example, in an embodiment, a certification structure, such as an X.509 certificate, may be used as a timestamp using the same principles as the aforementioned OCSP Response timestamp. The For example, the issuance date and time in the X.509 certificate's "notBefore" field may serve as the time reference. This date may not be literally accurate, exactly correspond to when a message was sent, but nevertheless may be reliable if the issuing CA systematically biases its time. The A receiving system can then reverse this bias when computing the timestamp, and in the event of a dispute the fact-finder in a legal proceeding can be advised of the CA's systematic bias in of its production of business records.timestamps can be accounted. For example, a CA that systematically biases its issuance date forward 10 minutes, or backwards by one day, may be reliable so long as the receiving system reverses the timestamp by 10 minutes backwards, or one day forwards, respectively. It may be appreciated by one with skill in the art that backwards reversal is not strictly necessary, so long as the timestamp is offered to prove the mere existence of a message by the given time. A message that had existed by time $t_0$, still had existed by any future time>$t_0$. Furthermore, mere randomness in the issuance date does not invalidate the time recorded in the issuance date ("notBefore") field, so long as the randomness is bounded.

A certification authority that issues certificates with beginning dates randomly up to one hour before or after the actual issuance remains reliable for the proposition that the message existed by at least one hour after $t_0$, the date recorded in the appropriate field.

The message or its representation, such as a message digest, may appear in any part of the signed data structure of the X.509 certificate. User-supplied data areas may include the Distinguished Name field (for example, Common Name), the e-mail field, or various certificate extension fields. In the case of the e-mail address, plus-addressing may be used to generate variations of e-mail addresses that correspond to the same mailbox of a user, if the user's mail server supports plus-addressing. For example, a user has may have an e-mail address localuser@example.com for a message $m_1$ with SHA-1 hash DEADBEEF, and the user's mail server supports plus-addressing. The e-mail address registered with the registration authority for the CA is "localuser+sha1-DEADBEEF@example.com." In such a case, the message digest is incorporated into the certificate data structure, while the user may still receive a verification e-mail which will enable the user or a system on the user's behalf to procure a certificate.

Another possible location is within the public key data structure that is within the X.509 certificate. In an exemplary embodiment, the X.509 certificate contains may contain an RSA public key data structure stored in accordance with PKCS #1 standard. The public key structure in ASN.1 is RSAPublicKey, with a SEQUENCE containing modulus INTEGER and publicExponent INTEGER. One option is to encode the hash directly in the modulus INTEGER value. This technique may be used when the CA does not perform checking on the public key. Such checking, including verifying the signature of a certificate signing request (CSR), would fail. Another option is to encode the hash as a follow-on OCTET STRING or other data element in the SEQUENCE, following the publicExponent INTEGER. In such a case, the CA and follow-on cryptographic stacks may perform verification successfully, so long as they do not require that the RSAPublicKey SEQUENCE have only the two defined INTEGER values. The CA would be able to detect such an insertion, however, and may screen out the message data by inserting only the modulus and publicExponent in the public key structure of the certificate.

In one embodiment, multiple message representations may be placed in a single X.509 certificate structure. Multiple representations in an OCSP structure have already been shown, as in the preceding paragraphs. By way of example for X.509, the user may register multiple e-mail addresses for inclusion in multiple "E" or "subjectAltName" structures within the certificate, or may include multiple representations in a single field, separated implicitly by the known length of the hash, or explicitly by a "|" character or other delimiter.

It may be appreciated by one skilled in the art that proof of the existence of a message by time t0, proves the existence of all of the contents of the message by time t0, when the integrity of the message can also be proved. A cryptographic hash value supplies these proofs. Therefore one may appreciate that in one embodiment the hash value appears in the digitally signed structure, but is the hash of a data structure containing further message representations (i.e., hash values). The data structure may be a simple ASN.1 SEQUENCE OF OCTET STRINGS with some implied or expressed value for the digest algorithm, or something more elaborate, such as a SET of PKCS #1 DigestInfo blocks (themselves being a SEQUENCE of digestAlgorithm (ultimately OID) and digest (OCTET STRING)). These further message representations represent messages to be timestamped, or may recursively refer to yet more data structures.

One application of this embodiment is when a user renews his or her certificate with a new certificate containing a new validity period. For example, the an old certificate is may be valid from Jan. 1, 2008 (12:00 am) through Jan. 1, 2009 (11:59 pm)—thus, one year and nearly one day—), while the a new certificate is that has been applied for may be valid beginning on Jan. 1, 2009 at 9:30 am in the morning, and is issued to be valid from Jan. 1, 2009 (9:33 am) through Jan. 2, 2010 (9:32 am). The assurance software keeps 114 may keep track of any communications that it wishes to timestamp: for example, messages sent by the user using the old certificate. The assurance software generates 114 may generate a data structure containing representations of these communications, such as cryptographic hashes. A representation of this data structure (such as a cryptographic hash) is may be generated and included in the certificate request, so that the certificate from the CA contains the representation.

Thereafter, the assurance software 114 that sends messages from the user includes may include the certificate used to sign the message, and with the data structure concurrently or separately. Meanwhile, the receiving assurance software 114 may extract the message hash from the certificate, compute the hash over the data structure also made available to the assurance software, and equate the computed hash with the extracted hash. Then, the hashes in the data structure may be matched with hashes of messages (note that these "messages" may be Signerinfo blocks, and thus, the hashes are Signerinfo blocks relating to user-written message content) that the recipient has already received, signed by the old certificate. In such a way, even if the old messages that refer to the old certificate are not timestamped, the messages (and their signatures) may be validated as originating from the signers of those messages, provided that the signers' credentials have not been revoked as of the time that the new certificate issues.

In a further embodiment, it may be appreciated that recursive references in data structures to yet more data structures, can mean that a sender need not transmit an all-or-nothing data structure to a recipient. Instead, the sender may transmit the primary data structure (whose representation, i.e., such as a hash, is may be included in the certificate or OCSP response forming the timestamp), which refers). This primary data structure may refer to some number of secondary data structures. The secondary data structures that contain message representations, so that collectively all secondary data structures encompass all messages of interest, divided by some arbitrary categorization (for example, by month in which the messages were composed). The sender may, in some instances, send just a subset of these secondary data structures, thus saving space in what needs to be transmitted to recipients.

One application of such embodiments is to procure timestamps with respect to messages that are legally time-sensitive at the end of the period by which they are time-sensitive. For example, an officer of a publicly-traded corporation may need to show that he approved of a sale by the end of a quarter, to avoid liability under SEC regulations for alleged sales in a quarter that were accounted for in a different quarter. By inserting a cryptographic hash into a certificate procured toward the end of that quarter, such as Mar. 31, 2009 at 11:55 pm, the officer may adduce the corresponding data structures that demonstrate the existence of a message approving of the sales order, to exculpate the officer from civil or criminal liability.

It may be appreciated that in such a case, the mere existence of the message may not be enough to prove that the officer sent the message, as the officer could have merely saved the message as a draft with intent not to send the message. However, evidence of the existence of such a message is generally better than no evidence. It may be further appreciated that because the user may include any data in such a data structure, the user may include message representations sent by others to the user.

In a further embodiment, the user requestscan requests a reply from the recipient or an intervening mail server respecting the successful delivery or transmission of a message (known as a "receipt"). The receipt may be digitally signed, such as a "signed receipt" in accordance with RFC 2634, which is a standard known to those skilled in the art. The receipt may be a mere unsigned delivery status notification per RFCs 1894 or 3464, or a manually written acknowledgement. It may be appreciated that even if the reply message content is not signed using S/MIME standards, the reply message headers may be signed using other standards such as DKIM. Furthermore, the reply message may contain an unambiguous (if not cryptographically provable) reference to the original message, including headers such as DKIM headers. Communications may be logged in mail transfer agent logs.

The user computes may compute a message representation (cryptographic hash) over the received message, and includes it in the data structure. In the event of jeopardy such as a legal proceeding, the user may adduce the corresponding data structures that demonstrate the fact that the message existed and was sent, to exculpate the user from civil or criminal liability.

The embodiments may also remember that the user viewed and implicitly trusted the message while the message is otherwise known to be trustworthy. For example, a system may store such information as a preference, for example, in a preference database on the computer on which the system runs. The system (on behalf of the user) can procure a cryptographic time stamp from a third-party TSA and associate that time stamp with the message.

In addition, embodiments of the present invention may compute indicia across different standards and may leverage different standards, such as DKIM, PGP, and the like. For example, DKIM can be used in the embodiments to determine information about relayers of a message, as ascertained through DKIM signers' keys. Indicia can be computed from PGP structures. Information gleaned from the different standards may be presented separately or simultaneously (in space and time). The true scope and spirit of the invention are indicated by the following claims.

What is claimed is:

1. A system comprising:
    one or more computer processors;
    a computer readable electronic memory storage in communication with the one or more processors, the computer readable electronic memory storage storing software modules including instructions that are executable by the one or more processors, the software modules including at least:
        an authentication module provided by an authenticatable entity configured to:
            access a message comprising content that has been digitally signed and message security data related to a third party;
            determine at least a portion of the message has been presented via a first user interface element under control of a first application by a first entity;
            generate one or more attestations about the message using the message and the message security data;
            determine whether the one or more attestations about the message are reliable based on criteria from the authenticatable entity;
            present the one or more attestations, an indication of the reliability of the one or more attestations, and an identification of the authenticatable entity in proximity to the first user interface element via a second user interface element under control of the authenticatable entity;
            present information about the one or more attestations in a chrome portion of a web page, wherein the web page comprises at least a portion of the message, and wherein the chrome portion is controlled by extended functionality of a browser running on the system; and
            present the indication of the reliability of the one or more attestations via the second user interface element under control of the authenticatable entity, wherein the authenticatable entity transfers responsibility for the indication of the reliability of the one or more attestations in the second user interface element.

2. The system of claim 1, wherein the authentication module is further configured to receive an e-mail message.

3. The system of claim 2, wherein the authentication module is further configured to receive an S/MIME e-mail message.

4. The system of claim 1, wherein the authentication module is further configured to: present at least a portion of a webmail message via a web page served by a webmail service or present at least a portion of an e-mail message via an e-mail client running on the system.

5. The system of claim 1, wherein the indication of the reliability of the one or more attestations is: part of the one or more attestations or separate from the one or more attestations.

6. The system of claim 1, wherein the authentication module is further configured to receive the message via a loopback port.

7. A computer-implemented method of indicating attestations about a message, said method comprising:
    under control of one or more computing devices configured with specific computer executable instructions,
    accessing, via an authentication module provided by an authenticatable entity, a message comprising content and message security data related to a third party;
    determining at least a portion of the message has been presented via a first user interface element under control of a first application by a first entity;
    generating at least one attestation about the message using the message and the message security data;
    determining whether the at least attestation about the message is reliable based on criteria from the authenticatable entity;
    presenting, in proximity to the at least a portion of the message, the at least one attestation, an indication of reliability of the at least one attestation, and an identification of the authenticatable entity via a second user interface element under control of the authenticatable entity, wherein the second user interface element indicates a difference in control by the authenticatable entity, the authenticatable entity authenticatable and distinct from the first entity;
    presenting information about the at least one attestation in a chrome portion of a web page, wherein the web page comprises at least a portion of the message, and wherein the chrome portion is controlled by extended functionality of a browser running on one or more of the one or more computing devices; and presenting the indication of the reliability of the at least one attestation via the second user interface element under control of the authenticatable entity, wherein the authenticatable entity transfers responsibility for the indication of the reliability of the at least one attestation in the second user interface element.

8. The method of claim 7, wherein accessing the message comprises accessing an e-mail message comprising content that has been digitally signed.

9. The method of claim 7, wherein the determining the at least a portion of the message has been presented via the first user interface element under control of the first application by the first entity comprises determining the at least a portion of the message has been presented: as a webpage served by the first application or via a messaging client.

10. The method of claim 8, wherein the presenting the at least one attestation, the indication of the reliability of the at least one attestation, and the identification of the authenticatable entity comprises presenting at least some of the at least one attestation, the indication of the reliability of the at least one attestation, or the identification of the authenticatable entity in a chrome portion of the webpage, wherein the chrome portion is controlled by the authenticatable entity.

11. The method of claim 7, wherein the presenting the at least one attestation, the indication of the reliability of the at least one attestation, and the identification of the authenticatable entity comprises further presenting information that indicates liability for the reliability of the at least one attestation regarding the third party that is known, but not necessarily trusted by the authenticatable entity.

12. The method of claim 7, wherein the presenting the at least one attestation, the indication of the reliability of the at least one attestation, and the identification of the authenticatable entity comprises further presenting information that indicates the liability for the reliability of the at least one attestation by a certification authority.

13. The method of claim 7, wherein the presenting the at least one attestation, the indication of the reliability of the at least one attestation, and the identification of the authenticatable entity further comprises presenting information that indicates the liability for the reliability of the at least one attestation by a certification authority that is known, but not necessarily trusted by the authenticatable entity.

14. The method of claim 7, wherein the presenting the at least one attestation, the indication of the reliability of the at least one attestation, and the identification of the authenticatable entity further comprises presenting information that indicates liability for reliability of the at least one attestation by a certification authority that is known, but not necessarily trusted by a recipient of the message.

15. The method of claim 7, wherein the indication of the reliability of the at least one attestation is: part of the at least one attestation or separate from the at least one attestation.

16. A system comprising:
one or more computer processors;
a computer readable electronic memory storage in communication with the one or more processors, the computer readable electronic memory storage storing software modules including instructions that are executable by the one or more processors, the software modules including at least:
an authentication module provided by an authenticatable entity configured to:
access a message and message security data;
determine at least a portion of the message has been presented via a user interface element controlled by a messaging system;
identify at least one attestation about the message;
determine whether the at least one attestation about the message is reliable using at least the message security data;
present the at least one attestation and an identification of the authenticatable entity in proximity to the at least a portion of the message via the user interface element controlled by the authenticatable entity, the authenticatable entity authenticatable and distinct from the messaging system;
present information about the at least one attestation in a chrome portion of a web page, wherein the web page comprises at least a portion of the message, and wherein the chrome portion is controlled by extended functionality of a browser running on the system; and
present the indication of a reliability of the at least one attestation via the second user interface element under control of the authenticatable entity, wherein the authenticatable entity transfers responsibility for the indication of the reliability of the at least one attestation in the second user interface element.

17. A computer-implemented method of indicating attestations about a message from a messaging system to be presented to a user, said method comprising:
under control of one or more computing devices configured with specific computer executable instructions,
identifying, by an authentication module provided by an authenticatable entity, when at least a portion of a message has been presented via a presentation interface that is at least partially under control of the messaging system;
accessing security data related to the message;
generating at least one attestation about the message based at least on the security data;
determining whether the at least one attestation about the message is reliable based on criteria from the authenticatable entity;
presenting the at least one attestation about the message, an indication of the reliability of the at least one attestation, and an identification of the authenticatable entity in proximity to the at least a portion of the message via a user interface element that is not under control of the messaging system and under control of the authenticatable entity, the authenticatable entity distinct from the messaging system, and wherein the authenticatable entity is able to be authenticated;
presenting information about the at least one attestation in a chrome portion of a web page, wherein the web page comprises at least a portion of the message, and wherein the chrome portion is controlled by extended functionality of a browser running on one or more of the one or more computing devices; and
presenting the indication of the reliability of the at least one attestation via the second user interface element under control of the authenticatable entity, wherein the authenticatable entity transfers responsibility for the indication of the reliability of the at least one attestation in the second user interface element.

18. The method of claim 17, wherein the presenting the at least one attestation about the message, the indication of the reliability of the at least one attestation, and the identification of the authenticatable entity comprises presenting at least some of the at least one attestation about the message, the indication of the reliability of the at least one attestation, or the identification of the authenticatable entity: in the chrome portion of a webmail web page or in the chrome portion of an e-mail displayed via an e-mail client.

19. The method of claim 17, wherein the indication of the reliability of the at least one attestation is: part of the at least one attestation or separate from the at least one attestation.

* * * * *